United States Patent
Palese

(10) Patent No.: US 12,261,645 B2
(45) Date of Patent: Mar. 25, 2025

(54) MULTI-NODE, MULTI-STREAM PHOTONIC INTEGRATED CIRCUIT-BASED FREE-SPACE OPTICAL COMMUNICATION DEVICE

(71) Applicant: Raytheon Company, Waltham, MA (US)

(72) Inventor: Stephen P. Palese, Redondo Beach, CA (US)

(73) Assignee: Raytheon Company, Arlington, VA (US)

( * ) Notice: Subject to any disclaimer, the term of this patent is extended or adjusted under 35 U.S.C. 154(b) by 374 days.

(21) Appl. No.: 17/811,565

(22) Filed: Jul. 8, 2022

(65) Prior Publication Data

US 2024/0372623 A1 Nov. 7, 2024

(51) Int. Cl.
*H04B 10/50* (2013.01)
*H04B 10/11* (2013.01)

(52) U.S. Cl.
CPC ........... *H04B 10/503* (2013.01); *H04B 10/11* (2013.01); *H04B 10/506* (2013.01)

(58) Field of Classification Search
CPC ..... H04B 10/503; H04B 10/11; H04B 10/506
USPC ....................................................... 398/204
See application file for complete search history.

(56) References Cited

U.S. PATENT DOCUMENTS

| | | |
|---|---|---|
| 3,975,628 A | 8/1976 | Graves et al. |
| 4,867,518 A | 9/1989 | Stamnitz et al. |
| 5,852,687 A | 12/1998 | Wickham |
| 7,408,507 B1 | 8/2008 | Paek et al. |
| 7,729,572 B1 | 6/2010 | Pepper et al. |
| 7,949,030 B2 | 5/2011 | Volodin |
| 8,068,235 B1 | 11/2011 | Marron et al. |
| 9,515,390 B1 * | 12/2016 | Feng .................... H01Q 15/148 |
| 9,525,489 B2 * | 12/2016 | Schuetz ........... H04B 10/25759 |
| 10,224,628 B2 | 3/2019 | Vidal Drummond et al. |
| 10,838,222 B2 | 11/2020 | Khachaturian et al. |
| 11,029,465 B1 | 6/2021 | Rakowski et al. |
| 11,855,692 B2 * | 12/2023 | Murakowski ........ H01Q 25/008 |
| 2004/0101317 A1 | 5/2004 | Yap et al. |
| 2006/0239312 A1 | 10/2006 | Kewitsch et al. |
| 2015/0293224 A1 | 10/2015 | Eldada et al. |

(Continued)

FOREIGN PATENT DOCUMENTS

| | | | |
|---|---|---|---|
| CN | 110572210 A | * 12/2019 | |
| CN | 113608228 A | * 11/2021 | ............ G01S 7/4911 |
| EP | 3761528 A1 | 1/2021 | |

OTHER PUBLICATIONS

Office Action dated Oct. 25, 2023 in connection with U.S. Appl. No. 17/809,073, 9 pages.

(Continued)

*Primary Examiner* — Abbas H Alagheband

(57) ABSTRACT

An apparatus includes a photonic integrated circuit having an optical phased array. The optical phased array includes multiple unit cells, where each unit cell includes an antenna element configured to transmit or receive optical signals. The unit cells are grouped into multiple supercells, and each supercell includes multiple unit cells. The apparatus also includes multiple arms configured to modify the optical signals transmitted or received by the optical phased array. Different ones of the arms are controllable to support transmission or reception of different optical signals in different directions.

20 Claims, 8 Drawing Sheets

(56) References Cited

U.S. PATENT DOCUMENTS

| | | | |
|---|---|---|---|
| 2016/0094016 | A1 | 3/2016 | Beach et al. |
| 2017/0234984 | A1* | 8/2017 | Khial ................ G01S 7/4817 356/5.1 |
| 2017/0324162 | A1 | 11/2017 | Khachaturian et al. |
| 2018/0039154 | A1 | 2/2018 | Hashemi et al. |
| 2018/0107091 | A1 | 4/2018 | Hosseini et al. |
| 2019/0004151 | A1* | 1/2019 | Abediasl ............... G01S 7/4817 |
| 2019/0267708 | A1 | 8/2019 | Tennant et al. |
| 2019/0339389 | A1* | 11/2019 | Russo ................ H01Q 3/2676 |
| 2020/0049886 | A1* | 2/2020 | Chriqui ................ G01S 7/4811 |
| 2020/0192179 | A1 | 6/2020 | Hajimiri |
| 2020/0217961 | A1* | 7/2020 | Russo ................ G01S 7/4911 |
| 2020/0284910 | A1 | 9/2020 | Yaacobi et al. |
| 2021/0149227 | A1 | 5/2021 | Lee et al. |
| 2021/0381964 | A1 | 12/2021 | Puppe et al. |
| 2022/0063031 | A1 | 3/2022 | Ho et al. |
| 2022/0128666 | A1* | 4/2022 | Schrans ................ G02F 1/292 |
| 2022/0224413 | A1 | 7/2022 | Shamee |
| 2022/0229343 | A1 | 7/2022 | Kendrick et al. |
| 2022/0244578 | A1 | 8/2022 | Palese et al. |
| 2022/0252786 | A1* | 8/2022 | Yengst ................ H04B 10/503 |
| 2022/0252908 | A1 | 8/2022 | Inamdar et al. |
| 2022/0255219 | A1 | 8/2022 | Kendrick et al. |
| 2022/0255221 | A1 | 8/2022 | Palese et al. |

OTHER PUBLICATIONS

Palese et al., "Photonic Integrated Circuit With Independent Unit Cells Having Multi-Polarization Sensitivity" U.S. Appl. No. 17/654,200, filed Mar. 9, 2022, 44 pages.
Palese et al., "Photonic Integrated Circuit-Based Polarization-Independent Optical Devices" U.S. Appl. No. 17/659,789, filed Apr. 19, 2022, 44 pages.
Palese et al., "Photonic Integrated Circuit Multi-Wavelength Phase Modulator Networks" U.S. Appl. No. 17/806,873, filed Jun. 14, 2022, 53 pages.
Palese et al., "Photonic Integrated Circuit-Based Optical Communication Optimized For Receive Aperture Amplitude And Phase Modulations" U.S. Appl. No. 17/734,887, filed May 2, 2022, 48 pages.
Palese et al., "Photonic Integrated Circuit With Inverted H-Tree Unit Cell Design" U.S. Appl. No. 17/809,608, filed Jun. 29, 2022, 48 pages.
Palese, "Photonic Integrated Circuit Temporal And Frequency Dispersion Squint Correction For Optical Phased Array" U.S. Appl. No. 17/809,073, filed Jun. 27, 2022, 51 pages.
Palese, "Photonic Integrated Circuit-Based Transmissive/Reflective Wavefront Optical Phase Control" U.S. Appl. No. 17/662,797, filed May 10, 2022, 43 pages.
Kendrick et al., "Photonic Integrated Circuit-Based Imaging Systems" U.S. Appl. No. 17/654,204, filed Mar. 9, 2022, 35 pages.
International Search Report and Written Opinion of the International Searching Authority dated Feb. 24, 2022 in connection with International Patent Application No. PCT/US2021/059421, 16 pages.
International Search Report and Written Opinion of the International Searching Authority dated Apr. 8, 2022 in connection with International Patent Application No. PCT/US2021/064527, 10 pages.
Office Action dated Apr. 13, 2022 in connection with U.S. Appl. No. 17/174,132, 20 pages.
Blumenthal, "Silicon Nitride in Silicon Photonics," Proceedings of the IEEE, vol. 106, No. 12, Dec. 2018, 23 pages.
He et al., "Review of Photonic Integrated Optical Phased Arrays for Space Optical Communication," IEEE Access, vol. 3, Oct. 2020, 16 pages.

Creedon et al., "High efficiency coherent beam combining of semiconductor optical amplifiers," Optics Letters, vol. 37, No. 23, Dec. 2012, 3 pages.
Fatemi et al., "A Nonuniform Sparse 2-D Large-FOV Optical Phased Array With a Low-Power PWM Drive," IEEE Journal of Solid-State Circuits, vol. 54, Issue 5, May 2019, 16 pages.
Heidel et al., "A Review of Electronic-Photonic Heterogeneous Integration at DARPA," IEEE Journal of Selected Topics in Quantum Electronics, vol. 22, No. 6, Nov. 2016, 9 pages.
Kim et al., "A Single-Chip Optical Phased Array in a Wafer-Scale Silicon Photonics / CMOS 3D-Integration Platform," IEEE Journal of Solid-State Circuits, vol. 54, Issue 11, Nov. 2019, 14 pages.
Komljenovic et al., "On-chip calibration and control of optical phased arrays," Optics Express, vol. 26, No. 3, Jan. 2018, 12 pages.
Larocque et al., "Beam steering with ultracompact and low-power silicon resonator phase shifters," Optics Express, vol. 27, No. 24, Nov. 2019, 16 pages.
Li et al., "Fast Optical Phased Array Calibration Technique for Random Phase Modulation LiDAR," IEEE Photonics Journal, vol. 11, No. 1, Feb. 2019, 10 pages.
Marron et al., "Atmospheric turbulence correction using digital holographic detection: experimental results," Optics Express, vol. 17, No. 14, Jul. 2009, 14 pages.
Marron et al., "Extended-range digital holographic imaging," Proc. of SPIE, vol. 7684 76841J, 2010, 6 pages.
Mehta et al., "An Optically Sampled ADC in 3D Integrated Silicon-Photonics/65nm CMOS," IEEE 2020 Symposium on VLSI Technology Digest of Technical Papers—THL.3, 2020, 2 pages.
Orcutt et al., "Open foundry platform for high-performance electronic-photonic integration," Optics Express, vol. 20, No. 11, May 2012, 11 pages.
Sayyah et al., "Two-dimensional pseudo-random optical phased array based on tandem optical injection locking of vertical cavity surface emitting lasers," Optics Express, vol. 23, No. 15, Jul. 2015, 12 pages.
Zhang et al., "Phase Calibration of On-Chip Optical Phased Arrays via Interference Technique," IEEE Photonics Journal, vol. 12, No. 2, Apr. 2020, 11 pages.
Kendrick et al., "Photonic Integrated Circuit Distance Measuring Interferometer," U.S. Appl. No. 16/929,907, filed Jul. 15, 2020, 35 pages.
Palese et al., "Photonic Integrated Circuit-Based Communication Transmit/Receive System," U.S. Appl. No. 17/174,132, filed Feb. 11, 2021, 61 pages.
Palese et al., "Photonic Integrated Circuit-Based Coherently Phased Array Laser Transmitter," U.S. Appl. No. 17/162,860, filed Jan. 29, 2021, 35 pages.
Kendrick et al., "Photonic Integrated Circuit-Based Optical Phased Array Phasing Technique," U.S. Appl. No. 17/174,180, filed Feb. 11, 2021, 60 pages.
Inamdar et al., "Photonic Integrated Circuit-Based Optical Phased Array Calibration Technique," U.S. Appl. No. 17/174,197, filed Feb. 11, 2021, 61 pages.
Abediasl et al., "Monolithic optical phased-array transceiver in a standard SOI CMOS process", Optics Express, vol. 23, No. 5, Mar. 2015, 11 pages.
Office Action dated Sep. 16, 2021 in connection with U.S. Appl. No. 17/174,132, 18 pages.
Ristic et al., "An Optical Phase-Locked Loop Photonic Integrated Circuit," Journal of Lightwave Technology, vol. 28, No. 4, Feb. 15, 2010, 13 pages.
Office Action issued Aug. 14, 2024 in connection with U.S. Appl. No. 17/809,073, 9 pages.

* cited by examiner

MULTI-NODE, MULTI-STREAM PHOTONIC INTEGRATED CIRCUIT-BASED FREE-SPACE OPTICAL COMMUNICATION DEVICE

TECHNICAL FIELD

This disclosure relates generally to optical systems. More specifically, this disclosure relates to a multi-node, multi-stream photonic integrated circuit (PIC)-based free-space optical communication device.

BACKGROUND

Next-generation optical phased arrays (OPAs) are being designed for use in free-space optical systems, which refer to systems where optical signals are transmitted and received through free space rather than through optical fibers. These optical phased arrays are often implemented using photonic integrated circuits (PICs). A photonic integrated circuit refers to a device that integrates multiple photonic or light-based functions into the device. A photonic integrated circuit may include an array of nano-antennas, which represent extremely small antennas that can be used for transmitting or receiving optical signals.

SUMMARY

This disclosure relates to a multi-node, multi-stream photonic integrated circuit (PIC)-based free-space optical communication device.

In a first embodiment, an apparatus includes a photonic integrated circuit having an optical phased array. The optical phased array includes multiple unit cells, where each unit cell includes an antenna element configured to transmit or receive optical signals. The unit cells are grouped into multiple supercells, and each supercell includes multiple unit cells. The apparatus also includes multiple arms configured to modify the optical signals transmitted or received by the optical phased array Different ones of the arms are controllable to support transmission or reception of different optical signals in different directions.

In a second embodiment, a method includes transmitting or receiving optical signals using a photonic integrated circuit having an optical phased array. The optical phased array includes multiple unit cells, where each unit cell includes an antenna element that transmits or receives the optical signals. The unit cells are grouped into multiple supercells, and each supercell includes multiple unit cells. The method also includes controlling multiple arms to modify the optical signals transmitted or received by the optical phased array. Different ones of the arms are controllable to support transmission or reception of different optical signals in different directions.

In a third embodiment, an optical node includes multiple optical transmitters, optical receivers, or optical transceivers. Each optical transmitter, optical receiver, or optical transceiver includes a photonic integrated circuit having an optical phased array. The optical phased array includes multiple unit cells, where each unit cell includes an antenna element configured to transmit or receive optical signals. The unit cells are grouped into multiple supercells, and each supercell includes multiple unit cells. Each optical transmitter, optical receiver, or optical transceiver also includes multiple arms configured to modify the optical signals transmitted or received by the optical phased array. Different ones of the arms are controllable to support transmission or reception of different optical signals in different directions.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
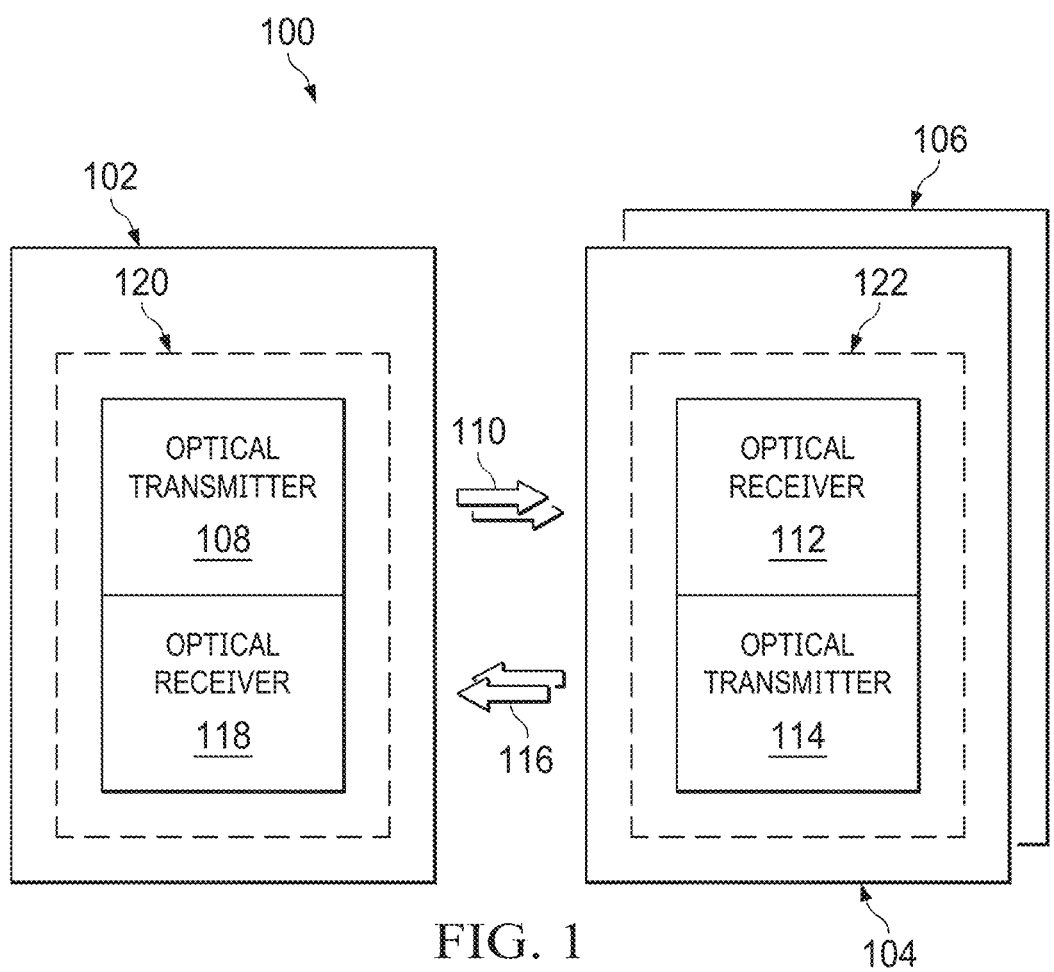
FIG. 1 illustrates an example system supporting multi-node, multi-stream photonic integrated circuit (PIC)-based free-space optical communication according to this disclosure.

FIGS. 1 through 9, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As noted above, next-generation optical phased arrays (OPAs) are being designed for use in free-space optical systems, which refer to systems where optical signals are transmitted and received through free space rather than through optical fibers. These optical phased arrays are often implemented using photonic integrated circuits (PICs). A photonic integrated circuit refers to a device that integrates multiple photonic or light-based functions into the device. A photonic integrated circuit may include an array of nano-antennas, which represent extremely small antennas that can be used for transmitting or receiving optical signals.

Optical phased arrays that are implemented using photonic integrated circuits typically have point-to-point link capabilities, which means that the photonic integrated circuit in one optical node can only communicate with the photonic integrated circuit in one other optical node. This can create issues when an optical node needs to communicate with multiple other optical nodes. In some cases, a photonic integrated circuit can be mounted to a rotatable gimbal, which can be used to point the photonic integrated circuit in different directions in order to facilitate optical communications between one optical node and multiple other optical nodes. However, gimbal-based photonic integrated circuits can still only support point-to-point link capabilities and typically have long slew and reacquisition times, which limits their connectivity efficiencies. This can be particularly problematic in dynamic mesh networks, where optical nodes are continuously entering and leaving a constellation or other network. In order to support point-to-multipoint link capabilities, it is typically necessary to include multiple photonic integrated circuits (possibly with multiple gimbals) in each optical node, which increases the size, weight, power, and cost (SWAP-C) of the optical nodes. When a relatively large number of optical links are desired at an optical node, it may be impossible to include a suitable number of photonic integrated circuits and a suitable number of gimbals in a specified package. In addition, rotating a photonic integrated circuit to point in a different direction generally disrupts and prevents ongoing communications, which means that communications can be lost completely while the photonic integrated circuit is being redirected.

This disclosure provides optical devices supporting multi-node, multi-stream PIC-based free-space optical communications. "Multi-node" generally refers to the ability of an optical device to physically transmit or receive optical signals to or from multiple other optical devices, such as by physically transmitting or receiving optical signals in multiple directions. "Multi-stream" generally refers to the ability of an optical device to transmit or receive optical signals containing different data streams, such as by transmitting or receiving first optical signals containing first data while simultaneously transmitting or receiving second optical signals containing second data. Note that while it is often assumed below that an optical device supports both multi-node and multi-stream functionalities, an optical device may instead support one (but not both) of these functionalities.

As described in more detail below, an optical device includes a photonic integrated circuit having multiple supercells, where each supercell represents a collection of individual unit cells. Each unit cell may include (i) an antenna element that can transmit or receive optical signals and (ii) a phase modulator that can be used to adjust the phases of the optical signals that are transmitted or received by the antenna element. The photonic integrated circuit also includes or is used in conjunction with an array of electro-optic modulators and an array of optical amplifiers. The electro-optic modulators can modulate the optical signals being transmitted or received by the supercells, and the optical amplifiers can amplify the optical signals being transmitted or received by the supercells. The supercells, electro-optic modulators, and optical amplifiers can also be controlled so that different individual supercells or different collections of supercells can be used independently for different optical communications. Thus, different individual supercells or different collections of supercells can be used to transmit or receive optical signals to or from multiple other optical devices. Also or alternatively, different individual supercells or different collections of supercells can be used to transmit or receive optical signals containing different data streams. As a particular example of this, multiple optical devices may represent satellites and ground- or air-based devices, and photonic integrated circuits in at least the satellites (and possibly the ground- or air-based devices) may enable these components to communicate with one another over a large number of optical communication links. Note that this does not prevent all of the supercells in an optical device from being used to enable communications with a single other optical device at times if needed or desired, such as when the longest range or highest data rate is needed or desired.

In this way, photonic integrated circuits can be used to achieve both point-to-point and point-to-multipoint link capabilities in optical devices, where the capabilities of the photonic integrated circuits can be reconfigurable in real-time as needed or desired. As a result, the optical devices may require fewer photonic integrated circuits while still supporting communications over multiple optical links. The photonic integrated circuits may or may not be mounted on rotatable gimbals, and (if not) this can eliminate the need to include rotatable gimbals in the optical devices. Overall, this can result in significant power, size, weight, and cost reductions in the optical devices. Moreover, these approaches can have significantly-improved slew and reacquisition times, which can increase the connectivity efficiencies of the optical devices and enable their usage in applications such as dynamic mesh networks. Further, these approaches can enable the use of a large number of optical links at individual optical devices. In some cases, for instance, a photonic integrated circuit may allow for up to 1,024 separate full-rate data streams and user connections (or more), which can be used concurrently to support communications with up to 1,024 other optical devices (or more). In addition, since there may be reduced or no need to physically redirect a photonic integrated circuit, there may be reduced or no disruptions to ongoing communications to support this functionality.

FIG. 1 illustrates an example system 100 supporting multi-node, multi-stream PIC-based free-space optical communication according to this disclosure. As shown in FIG. 1, the system 100 includes optical nodes 102-106 that communicate with one another optically. Each node 102-106 represents a ground-, air-, or space-based system that can transmit or receive data using optical communications. In this example, the node 102 can engage in bidirectional communication with each of the nodes 104-106, and the nodes 104-106 may similarly engage in bidirectional communication with one another. However, this is not necessarily required, and each of the nodes 102-106 may engage in unidirectional communication with at least one other node (meaning that node may only transmit or receive optical signals, at least with respect to one other node).

The node 102 in this example includes an optical transmitter 108, which generally operates to produce optical signals 110 used for communication or other purposes. For example, the optical transmitter 108 may encode information onto the optical signals 110, such as by using suitable amplitude, phase, frequency, or other modulation(s) of light. The optical signals 110 can be transmitted through free space or other transmission medium to the node 104 or 106, where an optical receiver 112 receives and processes the optical signals 110. For instance, the optical receiver 112 can identify the amplitude, phase, frequency, or other modulation(s) of light in the optical signals 110 and use the identified modulation(s) to recover the information encoded onto the optical signals 110. Any suitable type of modulation/demodulation scheme may be used here to encode and decode the optical signals 110 (assuming communication is one purpose of the optical signals 110). Since the nodes 102-106 are bidirectional in this example, the same process can be used in the opposite direction, meaning an optical transmitter 114 of the node 104 or 106 produces optical signals 116 that are transmitted towards the node 102 and received and processed by an optical receiver 118 of the node 102.

Note that while the optical transmitter 108 and the optical receiver 118 are shown here as separate components, they can be integrated into a single optical transceiver 120. This may allow, for example, the same PIC-based structure to be used for both transmission and reception purposes. Similarly, while the optical transmitter 114 and the optical receiver 112 are shown here as separate components, they can be integrated into a single optical transceiver 122. This may allow, for instance, the same PIC-based structure to be used for both transmission and reception purposes.

As described in more detail below, each optical transmitter 108 and 114, optical receiver 112 and 118, or optical transceiver 120 and 122 may include at least one PIC-based optical phased array, which can be used to transmit or receive the optical signals 110 and 116. At least one of these optical phased arrays can support multi-node, multi-stream PIC-based optical communications, which allows at least one of the nodes 102-106 to use the same photonic integrated circuit to one or both of (i) transmit or receive optical signals to or from different nodes (in different directions) and (ii) transmit or receive optical signals containing different data streams.

The optical transmitters, receivers, and transceivers described in this disclosure may find use in a large number of applications. For example, optical transmitters, receivers, or transceivers may be used in data centers or telecommunication systems to transport information rapidly between locations, including the transport of large amounts of information over very large distances. As a particular example, optical transmitters, receivers, or transceivers may be used in optical 5G networks or other telecommunication networks that support optical communications. Optical transmitters, receivers, or transceivers may be used in consumer or commercial electronic devices, biomedical devices, or advanced computing devices to support optical-based communications with those devices. Optical transmitters, receivers, or transceivers may be used in airplanes, drones, satellites, autonomous vehicles, rockets, missiles, or other commercial or defense-related systems. Optical transmitters, receivers, or transceivers may be used in non-communication-related optical applications, such as laser detection and ranging (LADAR) applications or other applications that can use polarimetric processing with PIC-based optical phased arrays. In general, this disclosure is not limited to any particular application of the optical transmitters, receivers, and transceivers.

Although FIG. 1 illustrates one example of a system 100 supporting multi-node, multi-stream PIC-based free-space optical communication, various changes may be made to FIG. 1. For example, while only three nodes 102-106 are shown here, the system 100 may include any suitable number of nodes that engage in any suitable unidirectional, bidirectional, or other communications or other interactions with each other. Also, each node of the system 100 may include any suitable number of optical transmitters, receivers, or transceivers that communicate or otherwise use any number of optical signals. In addition, the system 100 is shown in simplified form here and may include any number of additional components in any suitable configuration as needed or desired.

Figure 2A:
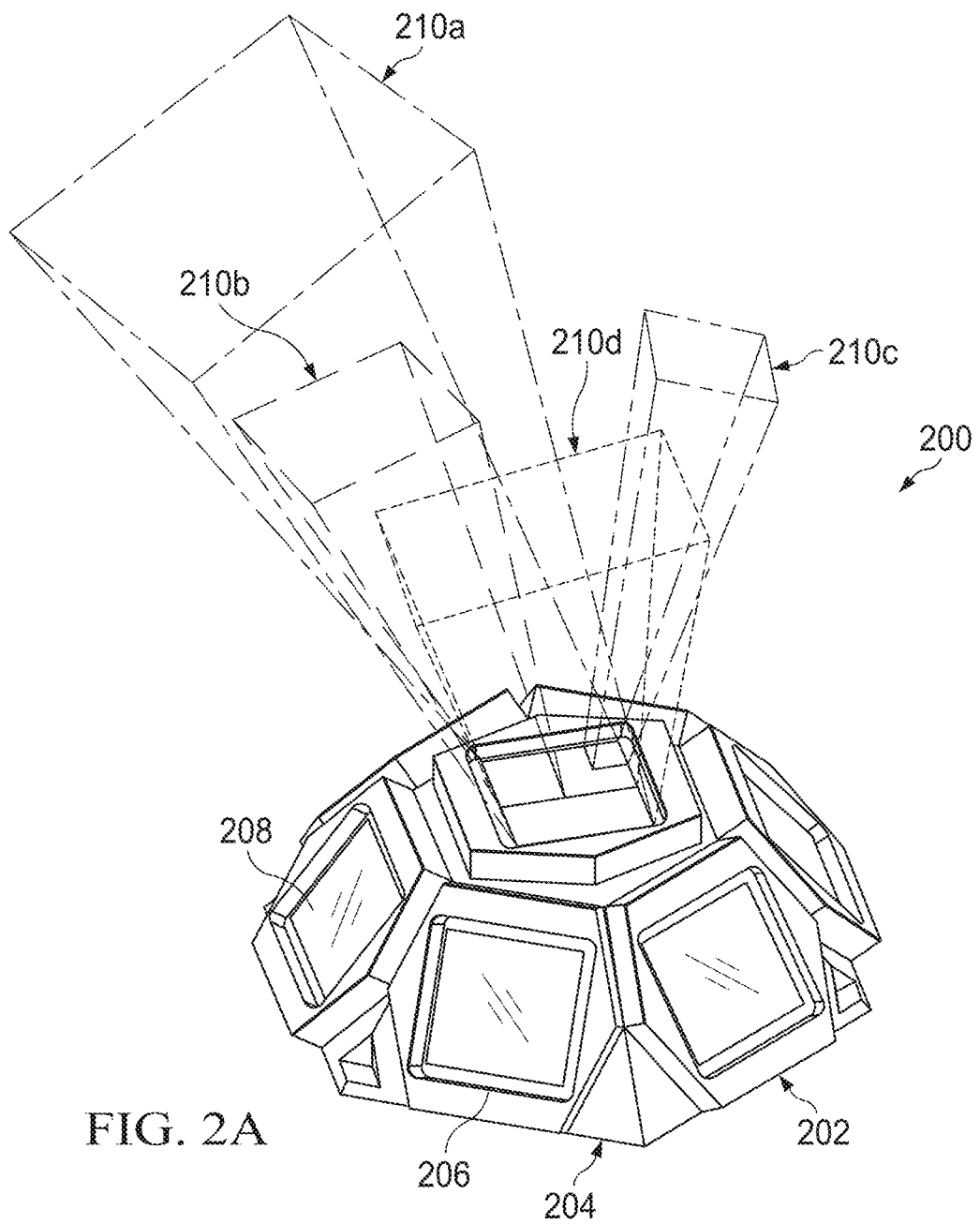
FIGS. 2A and 2B illustrate a more specific example of an optical node and system supporting multi-node, multi-stream PIC-based free-space optical communication according to this disclosure.
Figure 2B:
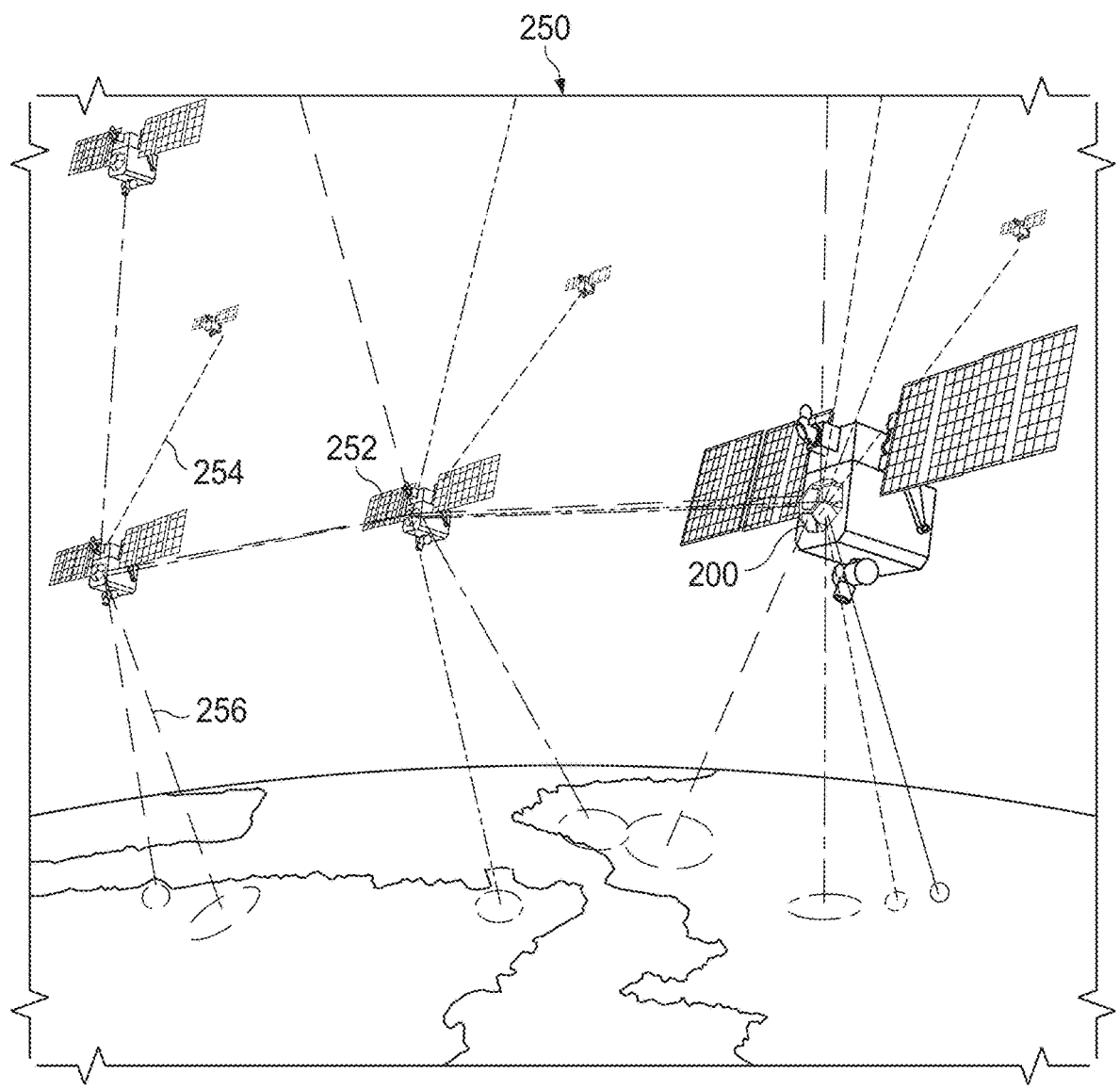

FIGS. 2A and 2B illustrate a more specific example of an optical node 200 and system 250 supporting multi-node, multi-stream PIC-based free-space optical communication according to this disclosure. As shown in FIG. 2A, the optical node 200 includes a housing 202, which can be used to encase and protect other components supporting PIC-based communications or other optical interactions. The housing 202 may be formed from any suitable material(s), such as one or more metals, and in any suitable manner. The housing 202 may also have any suitable size, shape, and dimensions. In this example, the housing 202 can be secured to a support structure 204, which represents any suitable structure on or to which the housing 202 can be secured. The housing 202 also defines at least one aperture 206 through which outgoing or incoming optical signals, such as the signals 110 and 116, may pass. In this particular example, the housing 202 supports an arrangement of seven apertures 206, which includes one aperture surrounded by six other apertures. Note, however, that the housing 202 may define any number of apertures, including a single aperture or one or more pairs of apertures (where each pair includes one aperture for transmission and one aperture for reception).

At least one optical transmitter, optical receiver, or optical transceiver 208 is positioned within the housing 202 and communicates or otherwise interacts optically via the at least one aperture 206. In this example, there are seven optical transmitters, receivers, or transceivers 208, including one optical transmitter, receiver, or transceiver surrounded by six other optical transmitters, receivers, or transceivers. This arrangement can provide an approximately semi-hemispherical coverage by the optical node 200. Depending on the implementation, each optical transmitter, receiver, or transceiver 208 may represent a transmitter, a receiver, or a transceiver, and different instances of the optical transmitters, receivers, or transceivers 208 may represent the same type of component or different types of components. In general, one or more optical transmitters, optical receivers, or optical transceivers may be used in the optical node 200.

As described in more detail below, each optical transmitter, receiver, or transceiver 208 may be implemented using a photonic integrated circuit, where the photonic integrated circuit includes multiple supercells. In one mode of operation, one, some, or all supercells in the photonic integrated circuit can be used to transmit or receive optical signals. When all supercells in the photonic integrated circuit are used to transmit or receive optical signals, this may enable the optical transmitter, receiver, or transceiver 208 to achieve the longest range or highest data rate. In another mode of operation, different supercells or different collections of supercells in the photonic integrated circuit can be used to transmit or receive optical signals in different directions, transmit or receive optical signals having different data streams, or both. One example of this mode of operation is shown in FIG. 2A, where the top optical transmitter, receiver, or transceiver 208 in the optical node 200 may transmit or receive optical signals to or from different areas 210a-210d. In some cases, the different areas 210a-210d may be associated with different optical devices that are communicating with the optical node 200. Also, in some cases, the different areas 210a-210d may be associated with different data streams. Overall, optical communications involving two or more areas 210a-210d may be associated with different optical beam directions, possibly along with one or more of: different data streams, different optical wavelengths/frequencies, different optical beam spatial shapes, and different optical beam spatial sizes.

As shown in FIG. 2B, the system 250 includes multiple satellites 252, which may be said to form at least part of a constellation. Each satellite 252 includes one or more instances of the optical node 200, which allow the satellites 252 to communicate over various optical links 254 involving satellites 252 and various optical links 256 involving ground- or air-based devices. As can be seen here, each satellite 252 may be able to support a number of optical links 254-256, where different optical links 254-256 are associated with different directions (and optionally different data streams, different optical wavelengths/frequencies, different optical beam spatial shapes, or different optical beam spatial sizes). Also, the optical links that are used by each satellite 252 may be easily reconfigurable as described below, which can support usage of the optical nodes 200 in highly-dynamic environments like optical mesh networks.

Although FIGS. 2A and 2B illustrate one more specific example of an optical node 200 and one more specific example of a system 250 supporting multi-node, multi-stream PIC-based free-space optical communication, various changes may be made to FIGS. 2A and 2B. For example, the optical node 200 may include any suitable number of optical transmitters, optical receivers, or optical transceivers 208 in any suitable arrangement to support communications or other interactions with one or more external components. Also, PIC-based communications or other interactions may be used in or by a wide range of devices and are not limited to the specific node 200 and the specific system 250 shown here. In addition, any other suitable components may be used with the optical node 200 or system 250 to support any other desired functions of the node 200 or system 250. For instance, the optical node 200 or each satellite 252 may include components that support the generation and transmission or the reception and processing of beacon signals. Beacon signals may be used to help identify where the optical node 200 or each satellite 252 is located or where other optical nodes 200 or satellites 252 are located, which can facilitate optical transmissions or receptions in desired directions.

Figure 3:
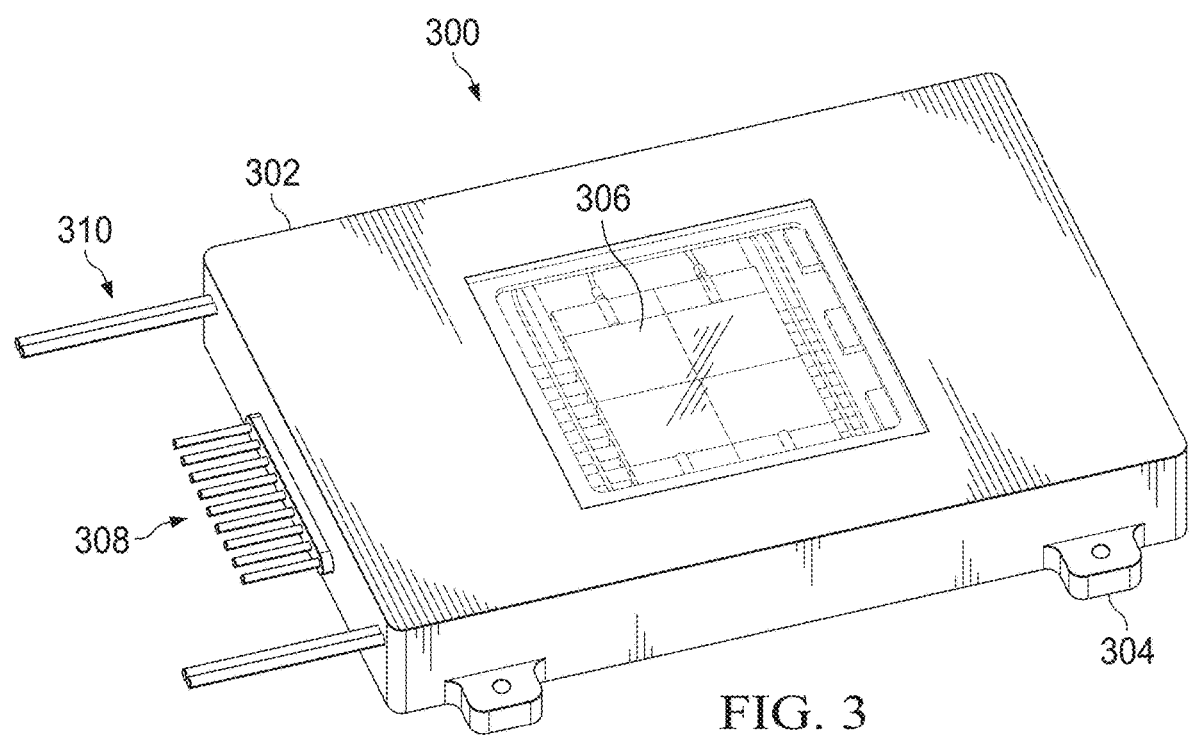
FIGS. 3 through 5 illustrate an example photonic integrated circuit-based optical device supporting multi-node, multi-stream PIC-based free-space optical communication according to this disclosure.
Figure 4:
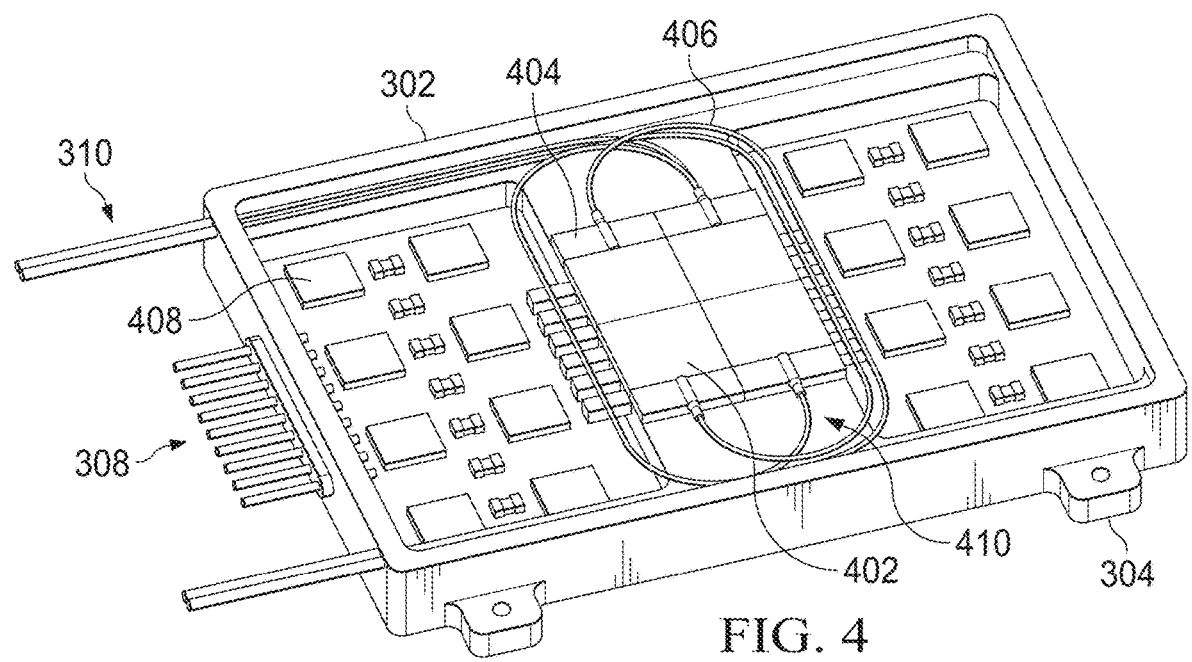
Figure 5:
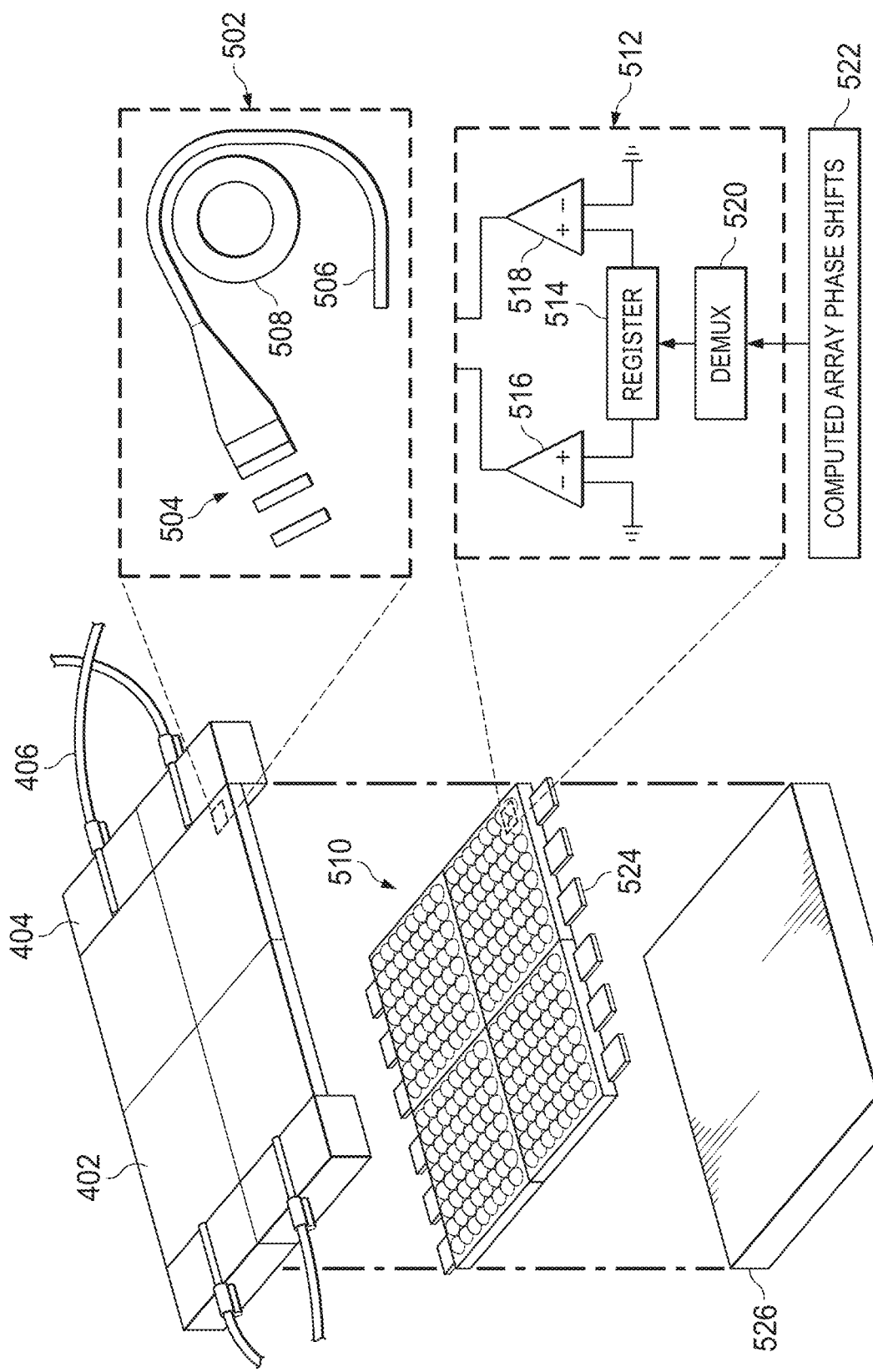

FIGS. 3 through 5 illustrate an example photonic integrated circuit-based optical device 300 supporting multi-node, multi-stream PIC-based free-space optical communication according to this disclosure. For case of explanation, the optical device 300 may be described as being used to implement each optical transmitter, optical receiver, or optical transceiver 208 in FIGS. 2A and 2B or each optical transmitter 108 and 114, optical receiver 112 and 118, or optical transceiver 120 and 122 in FIG. 1. However, the optical device 300 may be used in any other suitable device and in any other suitable system.

As shown in FIG. 3, the optical device 300 includes a package 302, which surrounds and protects electronic and optical components of an optical transmitter, optical receiver, or optical transceiver. For example, the package 302 may encase and form a hermetic seal around the electronic and optical components. The package 302 may be formed from any suitable material(s), such as one or more metals, and in any suitable manner. In some embodiments, the package 302 is formed using a nickel-cobalt or nickel-iron alloy (such as KOVAR) or other material that has a coefficient of thermal expansion closely matched to that of borosilicate or other glass. The package 302 may also have any suitable size, shape, and dimensions. In some cases, the package 302 may be formed in multiple parts that can be bonded, sealed, or otherwise coupled together to enclose the electronic and optical components. For instance, the package 302 may be formed using a larger lower portion and an upper cover such that the electronic and optical components can be inserted into the lower portion and the upper cover can be connected to the lower portion. Also, in some cases, the package 302 may include flanges 304 that support mounting of the package 302 to a larger structure. However, the package 302 may have any other suitable form.

The package 302 includes an optical window 306, which is substantially or completely transparent optically (at least with respect to the optical signals being transmitted from or received by the optical device 300). The optical window 306 may be formed from any suitable material(s), such as borosilicate glass or other glass, and in any suitable manner. The optical window 306 may also have any suitable size, shape, and dimensions. In some cases, the optical window 306 may also function as a bandpass or other optical filter that filters the wavelength(s) of the optical signals being transmitted from or received by the optical device 300.

The package 302 may also include one or more electrical feedthroughs 308, which represent one or more electrical connections that can be used to transport one or more electrical signals between the interior and the exterior of the package 302. The one or more electrical signals may be used here for any suitable purposes, such as to control one or more operations of the optical device 300. As a particular example, the one or more electrical signals may be used for controlling the phases of antenna elements of a photonic integrated circuit in the optical device 300. In addition, the package 302 may include one or more fiber inputs/outputs 310, which can be used to provide one or more input signals to the optical device 300 or receive one or more output signals from the optical device 300. For instance, the one or more input signals may carry information to be transmitted from the optical device 300, and the one or more output signals may carry information received at and recovered by the optical device 300. In this example, there are two fiber inputs/outputs 310, although the optical device 300 may include a single fiber input/output 310 or more than two fiber inputs/outputs 310. Note, however, that no fiber inputs/outputs 310 may be needed if all optical generation and processing occurs using components within the package 302, in which case the electrical feedthroughs 308 may be used to transport information or other signals to or from the optical device 300.

As shown in FIG. 4, a photonic integrated circuit 402 is positioned within the package 302, namely at a location where the photonic integrated circuit 402 can transmit or receive optical signals through the optical window 306. As described below, the photonic integrated circuit 402 may include supercells that can be controlled individually or in groups to support multi-node, multi-stream communications (in addition to use of the supercells collectively as a single group for a single communication link). The photonic integrated circuit 402 may also support a number of additional optical functions as needed or desired. The photonic integrated circuit 402 may be formed from any suitable material(s), such as silicon, indium phosphide, or gallium arsenide, and in any suitable manner. The photonic integrated circuit 402 may also have any suitable size, shape, and dimensions. As a particular example, the photonic integrated circuit 402 may be square and have an edge length of about 40 mm, although any other suitable sizes and shapes may be used here.

Fiber mounts 404 are used to couple to optical fibers 406 at locations where the optical fibers 406 can provide optical signals to or receive optical signals from the photonic integrated circuit 402. For example, the optical fibers 406 may provide optical signals from a source laser to the photonic integrated circuit 402 for use during outgoing transmissions. The optical fibers 406 may also or alternatively provide optical signals received by the photonic integrated circuit 402 to a receiver for processing. Each fiber mount 404 includes any suitable structure configured to be coupled to an optical fiber 406. Each optical fiber 406 represents any suitable length of an optical medium configured to transport optical signals to or from a photonic integrated circuit 402. Note that while four fiber mounts 404 and four optical fibers 406 are shown here, the optical device 300 may include, one, two, three, or more than four fiber mounts 404 and optical fibers 406. Also note that no fiber mounts 404 and optical fibers 406 may be needed if all optical generation and processing occurs using components of the photonic integrated circuit 402.

An electronic control board 408 includes electronic components, such as one or more integrated circuit chips and other components, that control the operation of the photonic integrated circuit 402. For example, the electronic control board 408 may include one or more components that calculate desired phases or phase corrections for optical signals to be transmitted by antenna elements of the photonic integrated circuit 402, which allows the electronic control board 408 to control functions such as beam forming or beam steering operations. Also or alternatively, the electronic control board 408 may include one or more components that calculate desired phases or phase corrections to be applied to optical signals received by antenna elements of the photonic integrated circuit 402, which allows the electronic control board 408 to control functions such as wavefront reconstruction operations. The electronic control board 408 includes any suitable components configured to perform one or more desired functions related to a photonic integrated circuit 402.

Spacers 410 may be positioned on opposite sides of the photonic integrated circuit 402 and used to help separate the optical fibers 406 from the electronic control board 408. The spacers 410 may be formed from any suitable material(s), such as ceramic, and in any suitable manner.

As shown in FIG. 5, the photonic integrated circuit 402 includes a number of unit cells 502. Each unit cell 502 is configured to transmit or receive one or more optical signals. The photonic integrated circuit 402 can include any suitable number of unit cells 502, possibly up to and including a very large number of unit cells 502. In some embodiments, for example, the photonic integrated circuit 402 may include an array of unit cells 502 up to a size of 1024×1024 (meaning over one million unit cells 502), 2048×2048 (meaning over four million unit cells 502), or even larger. The size of the photonic integrated circuit 402 is based, at least in part, on the number and size of the unit cells 502. As noted above, in some cases, the photonic integrated circuit 402 may be square with edges of about 40 mm in length. However, the photonic integrated circuit 402 may be scaled to smaller or larger sizes (such as about 2.5 cm by about 2.5 cm), while further scaling up to even larger sizes (such as about 20 cm by about 20 cm or about 30 cm by about 30 cm) may be possible depending on fabrication capabilities.

Each unit cell 502 includes an antenna element 504, which is configured to physically transmit or receive one or more optical signals to or from one or more external devices or systems. For example, each antenna element 504 may represent a nanophotonic antenna or other antenna element that transmits or receives at least one optical signal, along with one or more lenses or other optical devices configured to focus or otherwise process the at least one optical signal. Depending on the implementation, the antenna element 504 may sometimes be referred to as an emitter in a transmitting array or a receiver in a receiving array. Each antenna element 504 may have any suitable size, shape, and dimensions. In some cases, the emitting/receiving surface of the antenna element 504 may be about 3 µm to about 4 µm in diameter. Note that while a single antenna element 504 is shown here, each unit cell 502 may include multiple antenna elements 504, such as when two antenna elements 504 are arranged orthogonally or substantially orthogonally with respect to one another. This arrangement may, for instance, provide the unit cells 502 with multi-polarization sensitivity.

Each antenna element 504 here is coupled to a signal pathway 506. The signal pathways 506 are configured to transport optical signals to or from the antenna elements 504. For example, the signal pathways 506 can provide optical signals to the antenna elements 504 for transmission. Also or alternatively, the signal pathways 506 can provide optical signals received by the antenna elements 504 to optical detectors or other components for processing. Each signal pathway 506 includes any suitable structure configured to transport optical signals, such as an optical waveguide. Note that only a portion of the signal pathway 506 may be shown in FIG. 5, since a signal pathway 506 can vary based on how the associated unit cell 502 is designed and positioned within the photonic integrated circuit 402.

Modulators 508 are provided in the unit cells 502 for the antenna elements 504 and are used (among other things) to control the phases of optical signals transmitted or received by the associated antenna elements 504. For example, when the antenna elements 504 are transmitting, the modulators 508 can be used to achieve desired phases of outgoing optical signals in order to support functions such as beam forming or beam steering. When the antenna elements 504 are receiving, the modulators 508 can be used to apply phase control to the incoming wavefront of received optical signals in order to support functions such as decomposing or reconstructing the wavefront. Each modulator 508 includes any suitable structure configured to modulate the phase of an optical signal, such as a resonant micro-ring modulator or a PN junction micro-ring modulator. In some cases, each modulator 508 may be a resonant micro-ring modulator that is about 5.5 µm in diameter, although modulators of other sizes may be used here.

The modulators 508 of the photonic integrated circuit 402 are electrically coupled to a digital read in integrated circuit (DRIIC) layer 510, which is used to provide electrical signals to the modulators 508 in order to control the phase modulations applied to the incoming or outgoing optical signals by the modulators 508. In some embodiments, the photonic integrated circuit 402 can be "flip-chip" bonded to the DRIIC layer 510, although other mechanisms for electrically coupling the photonic integrated circuit 402 and the DRIIC layer 510 may be used.

The DRIIC layer 510 in this example includes a number of individual DRIIC cells 512, where each DRIIC cell 512 may be associated with (and in some cases may have about the same size as) a corresponding one of the unit cells 502. The DRIIC cells 512 control the phase modulations that are applied by the modulators 508 of the unit cells 502. The DRIIC cells 512 may essentially function as digital-to-analog conversion devices, where digital programming (such as 2-bit, 8-bit, or other digital values) are converted into appropriately-scaled direct current (DC) analog voltages spanning a specific range of voltages. As a particular example, the DRIIC cells 512 may operate to convert digital values into suitable DC analog voltages between 0 V and 3.3 V, although other voltages (including negative voltages) can be supported depending on the implementation.

In this example, each DRIIC cell 512 may include a register 514 configured to store values associated with different phase shifts to be applied by the modulator 508 of its corresponding unit cell 502. To provide a desired phase shift, appropriate values from the register 514 are selected and provided to two amplifiers 516 and 518, which generate output voltages that are provided to the associated modulator 508. The output voltages control the phase shift provided by the associated modulator 508. Different values from the register 514 are provided to the amplifiers 516 and 518 over time so that different output voltages are applied to the associated modulator 508. In this way, each DRIIC cell 512 can cause its associated modulator 508 to provide different phase shifts over time, thereby supporting various functions like beam forming, beam steering, or wavefront reconstruction.

In some embodiments, each DRIIC cell 512 may be used to provide a relatively small number of different output voltages to its associated modulator 508. For example, in some cases, each DRIIC cell 512 can cause the associated modulator 508 to provide four different phase shifts. However, other numbers of output voltages and associated phase shifts may be supported here, such as when up to 256 different phase shifts or more are supported. Also, the output voltages provided to the modulators 508 by different DRIIC cells 512 may be different even when those modulators 508 are providing the same phase shift, which may be due to factors such as manufacturing tolerances. The actual output voltages used for each modulator 508 can be selected during calibration so that appropriate values may be stored in each register 514.

In this example, the actual values in each DRIIC cell 512 that are provided to the amplifiers 516 and 518 by the register 514 over time can be controlled using a demultiplexer 520. Each demultiplexer 520 receives a stream of computed array phase shifts 522 and outputs the phase shifts 522 that are to be applied by that DRIIC cell's associated modulator 508. The phase shifts 522 output by the demultiplexer 520 can identify or otherwise to be used to select specific values from the register 514 to be output to the amplifiers 516 and 518. The computed array phase shifts 522 here may be provided by one or more external components, such as the electronic control board 408 or an external component communicating with the electronic control board 408. While not shown here, array-level deserialization circuitry may be used to separate and fan out high-speed digital signals to the array of individual DRIIC cells 512.

Each register 514 includes any suitable structure configured to store and retrieve values. Each amplifier 516 and 518 includes any suitable structure configured to generate a control voltage or other control signal based on an input. Each demultiplexer 520 includes any suitable structure configured to select and output values.

Note that this represents one example way in which the modulators 508 of the unit cells 502 can be controlled. In general, any suitable technique may be used to provide suitable control voltages or other control signals to the modulators 508 for use in controlling the phase shifts provided by the modulators 508. For example, the approach shown in FIG. 5 allows values that are applied to the amplifiers 516 and 518 to be stored in the register 514 and retrieved as needed, which allows an external component to provide indicators of the desired values to be retrieved to the DRIIC cells 512. In other embodiments, an external component may provide digital values that are converted by different circuitry into analog values.

Various electrical connections 524 are provided in or with the DRIIC layer 510. The electrical connections 524 may be used to provide electrical signals to the DRIIC cells 512, such as when the electrical connections 524 are used to receive high-speed digital signals containing the computed array phase shifts 522 for the DRIIC cells 512. Any suitable number and arrangement of electrical connections 524 may be used here.

A thermal spreader 526 can be positioned in thermal contact with the DRIIC layer 510. The thermal spreader 526 helps to provide a more consistent temperature across the DRIIC layer 510 and the photonic integrated circuit 402 by functioning as a heat sink that removes thermal energy from the DRIIC layer 510 and the photonic integrated circuit 402. At times, the thermal spreader 526 may also provide thermal energy to the DRIIC layer 510, which helps to heat the DRIIC layer 510 and the photonic integrated circuit 402. Thermal energy that is generated by the DRIIC layer 510 or injected into the photonic integrated circuit 402 may vary over time, and the thermal spreader 526 can help to maintain a substantially constant temperature of the photonic integrated circuit 402. The thermal spreader 526 may be formed from any suitable material(s), such as one or more metals like copper, and in any suitable manner. The thermal spreader 526 may also have any suitable size, shape, and dimensions.

Although FIGS. 3 through 5 illustrate one example of a photonic integrated circuit-based optical device 300 supporting multi-node, multi-stream PIC-based free-space optical communication, various changes may be made to FIGS. 3 through 5. For example, one or more photonic integrated circuits may be packaged in any other suitable manner, arranged relative to other components in any other suitable manner, and coupled to other components in any other suitable manner. Also, any other suitable modulation control approach and any other suitable thermal management approach may be used with one or more photonic integrated circuits.

Figure 6:
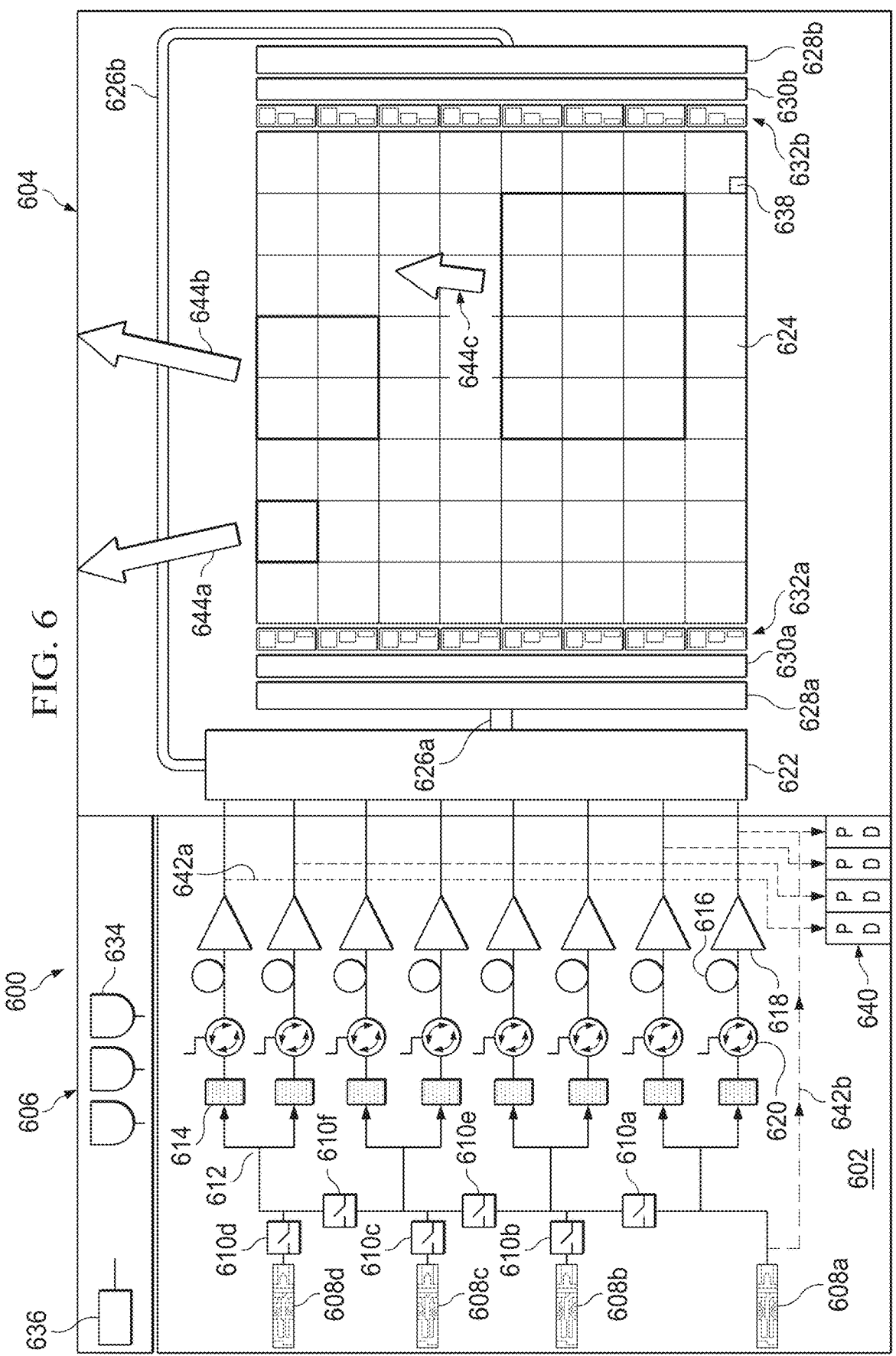
FIGS. 6 and 7 illustrate an example architecture of a photonic integrated circuit supporting multi-node, multi-stream free-space optical communication according to this disclosure.
Figure 7:
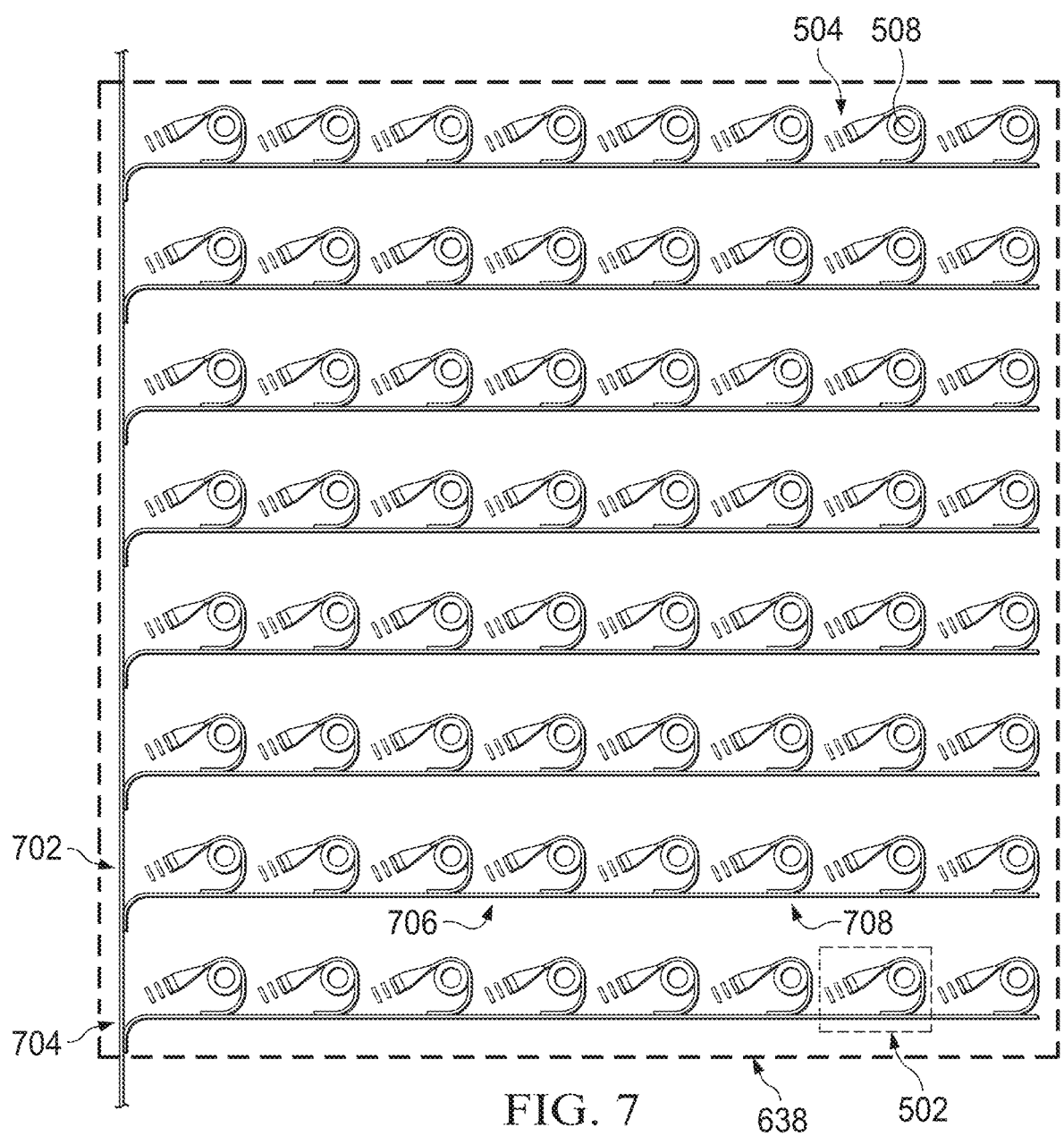

FIGS. 6 and 7 illustrate an example architecture 600 of a photonic integrated circuit supporting multi-node, multi-stream free-space optical communication according to this disclosure. For example, the architecture 600 may represent an example implementation of the photonic integrated circuit-based optical device 300 of FIGS. 3 through 5. In particular, the example architecture 600 of FIGS. 6 and 7 may be implemented within or using the photonic integrated circuit 402 of the optical device 300.

As shown in FIG. 6, the architecture 600 includes a source laser 602, an OPA 604, and a receiver 606. The source laser 602 generally operates to produce optical signals that are used by the OPA 604 to transmit outgoing optical signals. The OPA 604 generally operates to transmit outgoing optical signals and to receive incoming optical signals. The receiver 606 generally operates to process the incoming optical signals. These components allow the architecture 600 to support optical transceiver functionality, although some components may be removed from the architecture 600 if only optical transmitter or only optical receiver functionality is desired.

In this example, the source laser 602 includes an array of lasers 608a-608d, each of which operates to produce a lower-power input beam. Each laser 608a-608d includes any suitable structure configured to generate a laser output, such as a distributed feedback (DFB) diode laser. In some cases, each laser 608a-608d represents a fast tunable semiconductor master oscillator laser. Each lower-power input beam can have any suitable power level based on the laser 608a-608d being used for a specific application. In some cases, each lower-power input beam may have a power level of one or several tens of milliwatts to one or several hundreds of milliwatts, although these values are for illustration only. Also, in some cases, each laser 608a-608d may be fabricated using at least one group III element and at least one group V element and may therefore be referred to as a "III-V" laser. However, any other suitable materials may be used to fabricate each laser 608a-608d. Different lasers 608a-608d can be used here to produce optical signals having different wavelengths. For instance, four lasers 608a-608d may be used to produce optical signals having four distinct wavelengths $\lambda_0$-$\lambda_3$, respectively. Note, however, that more than four lasers 608a-608d may be used here, in which case optical signals having more than four wavelengths may be produced.

Switches 610a-610f can be used to selectively control which optical signals from the lasers 608a-608d are provided to other components of the architecture 600. For example, each switch 610a-610f can be opened or otherwise configured to block passage of optical signals from one of the lasers 608a-608d and can be closed or otherwise configured to allow passage of optical signals from one of the lasers 608a-608d. As described below, in one mode of operation, the switches 610a-610f may be configured to allow only the optical signals from the laser 608a to be provided to other components of the architecture 600, such as when the architecture 600 is being used to transmit optical signals in one direction (possibly at the longest range possible or the highest data rate possible). In another mode of operation, the switches 610a-610f may be configured to allow the optical signals from two or more of the lasers 608a-608d to be provided to other components of the architecture 600, such as when the architecture 600 is being used to transmit optical signals in multiple directions. Each switch 610a-610f includes any suitable structure configured to selectively block or permit passage of optical signals, such as an electro-optic (EO) switch or a PIC micro-electromechanical system (MEMS) switch.

In this example, optical signals from one or more of the lasers 608a-608d are provided to one or more splitters 612, each of which generally operates to split an input beam into optical signals traveling over different optical pathways or arms. In this example, each splitter 612 can receive and split one optical input in order to produce two optical outputs of substantially equal power, so the splitters 612 here form an array of Y-splitters. Note that the number of splitters 612 can vary based on the number of optical signals (beamlets) to be produced. Also note that while one level of splitters 612 is shown here, multiple levels of splitters 612 may be used, where the splitters 612 form a hierarchical arrangement (such as when at least one level of splitters 612 receives outputs from a preceding layer of splitters 612). For example, there may be five levels of splitters 612 if thirty-two optical signals are desired or six levels of splitters 612 if sixty-four optical signals are desired. However, other numbers of optical signals may be produced using any suitable number of splitters 612. Also note that any other suitable structure(s) may be used to split an optical signal, such as a multi-mode interferometer or a coupler tree. Further, note that each laser 608a-608d here is shown as being able to provide its optical signals to one splitter 612, although each laser 608a-608d may be able to provide its optical signals to multiple splitters 612.

The optical signals from the splitters 612 are provided to an array of electro-optic modulators (EOMs) 614, each of which can modulate one of the optical signals based on an input electrical signal. Each electro-optic modulator 614 can provide any suitable modulation here, such as amplitude modulation or phase modulation (depending on waveform type). This can be done, for example, to encode data onto the optical signals. Moreover, different modulations can be applied by different electro-optic modulators 614, which (as described below) may allow multiple data streams to be transmitted from or received by the OPA 604. Each electro-optic modulator 614 includes any suitable structure configured to optically modulate an optical signal, such as a Mach-Zehnder modulator (MZM).

The optical signals from the array of electro-optic modulators 614 can be phase shifted using an array of phase shifters 616, where each phase shifter 616 can shift the phase of one of the optical signals. Different phase shifts can be provided by different phase shifters 616, which (as described below) may allow optical signals to be transmitted from or received by the OPA 604 in different directions. Each phase shifter 616 includes any suitable structure configured to phase-shift an optical signal, such as a resonant micro-ring modulator. In some embodiments, the resonant micro-ring modulators may be silicon-based and have diameters of about 5 microns to about 6 microns, although other implementations of the phase shifters 616 may be used.

The phase-shifted optical signals are provided to an array of semiconductor optical amplifiers (SOAs) 618. Each semiconductor optical amplifier 618 amplifies one of the phase-shifted optical signals to produce a higher-power version of that optical signal. Each semiconductor optical amplifier 618 represents any suitable semiconductor-based amplifier configured to amplify an optical signal. Each of the amplified optical signals can have any suitable power level based on the semiconductor optical amplifiers 618 being used. In some cases, the amplified optical signals may each have a power level of about three watts, although this value is for illustration only. The amplified optical signals can be provided to the OPA 604 for use as described below. In some embodiments, the architecture 600 allows for source-coherent combination of the outputs from multiple semiconductor optical amplifiers 618, such as when the amplifiers 618 can be controlled to form a phase-locked array of SOAs. Note that the paths or arms of the source laser 602 also include circulators 620, which can support usage of the phase shifters 616 and semiconductor optical amplifiers 618 during receive operations as described below.

The amplified optical signals from the semiconductor optical amplifiers 618 may optionally be provided to an optical matrix 622, which can be used to selectively control which amplified optical signals are provided (via other components) to different portions of the photonic integrated circuit 402. In this example, the photonic integrated circuit 402 is implemented using supercells 624, where each supercell 624 includes a subset of the unit cells 502. In some embodiments, for example, each supercell 624 may include a 32×32 arrangement or a 64×64 arrangement of unit cells 502, although other numbers and arrangements of unit cells 502 may be used in each supercell 624. In this particular example, the photonic integrated circuit 402 includes sixty-four supercells 624, although other numbers of supercells 624 may be used. Here, one or more waveguides 626a and one or more waveguides 626b help to couple the optical matrix 622 to the supercells 624. The optical matrix 622 can be reconfigurable so that optical signals (such as optical signals having different wavelengths $\lambda_0$-$\lambda_3$) may be provided to or received from different supercells 624 or collections of supercells 624 over time. The optical matrix 622 includes any suitable structure configured to controllably route optical signals. Note, however, that use of the optical matrix 622 is optional. In other cases, the optical matrix 622 may be omitted, and dedicated waveguides may be provided between the amplifiers 618 and other components of the OPA 604. This may allow, for instance, specific wavelengths to be routed to specific unit cells 502 or supercells 624 for interference mitigation.

As shown here, the waveguides 624a-624b provide optical signals to splitters 628a-628b, such as 2×8 optical splitters, each of which splits two optical signals into more-numerous optical signals. Note that the use of 2×8 optical splitters here is based on the assumption that two waveguides 626a and two waveguides 626b are used, but other numbers of waveguides 626a-626b can be used, which would alter the design of the splitters 628a-628b. Additional splitters 630a-630b, such as 8×32 splitters, split those optical signals into even more-numerous optical signals. This results in the creation of sixty-four optical signals, which can be used to drive the supercells 624. Note that this arrangement of 2×8 and 8×32 splitters is merely one example of how the supercells 624 in this specific photonic integrated circuit 402 may be driven. Other approaches may be used to drive a photonic integrated circuit 402, including approaches that use other numbers or arrangements of splitters. The specific approach shown in FIG. 6 is merely one example of how supercells 624 of this specific photonic integrated circuit 402 may be driven.

Time delay paths 632a-632b are provided between the splitters 630a-630b and the supercells 624 in order to compensate for different optical path lengths to reach the different supercells 624. For example, assume that each row of supercells 624 in the photonic integrated circuit 402 is driven using four outputs from the splitter 630a and four outputs from the splitter 630b. Without compensation, different outputs from the splitters 630a-630b would reach different supercells 624 at different times, which can create undesired phase differences and reduce the throughput of the architecture 600. The time delay paths 632a-632b represent spiraled or other optical pathways that delay at least some of the outputs from the splitters 630a-630b so that the outputs from the splitters 630a-630b reach all supercells 624 at substantially the same time. For example, the time delay paths 632a-632b may delay signals to closer supercells 624 by larger amounts and delay signals to farther supercells 624 by smaller or no amounts. Note that if the waveguides 626a-626b have significantly different path lengths, the time delay paths 632a-632b can be configured to account for those differences in optical path lengths, as well. The optical signals that are received at the supercells 624 are used by the supercells 624 to produce outgoing optical signals.

The supercells 624 may also receive incoming optical signals, which can be transported over the waveguides 624a-624b and through the phase shifters 616 and semiconductor optical amplifiers 618. The incoming optical signals are then provided via the circulators 620 to the receiver 606. In this example, the receiver 606 includes multiple photodetectors 634, such as multiple photodiodes that convert the received incoming optical signals into electrical currents. One or more transimpedance amplifiers 636 convert the electrical currents into electrical voltages, which can then be further processed (such as to recover information contained in the incoming optical signals). In some embodiments, each circulator 620 may be coupled to its own photodetector 634, and each photodetector 634 may be coupled to a transimpedance amplifier 636.

Note that the source laser 602 and various components of the OPA 604 may be fabricated from different materials in order to allow for different optical power levels to be used in the architecture 600. For example, components of the source laser 602 may be fabricated using silicon nitride, germanium, or other materials that allow the source laser 602 to generate relatively high-power optical beams for the OPA 604. In the OPA 604, the optical matrix 622, waveguides 624a-624b, and splitters 628a-628b may similarly be fabricated using silicon nitride or other materials that support the transport and splitting of the relatively high-power optical beams from the source laser 602. The splitters 630a-630b may be fabricated using silicon (rather than silicon nitride) or other materials that can split lower-power optical signals (since the optical energy from the source laser 602 has already been split at this point). However, the components of the architecture 600 may be fabricated from any other suitable materials. Also note that various components of the architecture 600 may or may not be fabricated using one or more common materials.

A portion 638 of one of the supercells 624 is identified in FIG. 6 and shown in greater detail in FIG. 7. As shown in FIG. 7, this portion 638 of the supercell 624 includes an 8×8 arrangement of unit cells 502, where each unit cell 502 has the same or similar structure to that shown in FIG. 5 (note, however, that the structure of each unit cell 502 can be modified as needed or desired). These unit cells 502 are fed using a feed path 702, where splitters 704 are positioned along the feed path 702 to split off portions of an optical signal. These portions of the optical signals are provided over feed paths 706, where splitters 708 are positioned along the feed paths 706 to further split off portions of the optical signal. Ideally, the splitters 704 and 708 are configured such that each of the unit cells 502 receives a substantially equal portion of the optical signal input to the feed path 702. In some embodiments, the feed paths 702, 706 and splitters 704, 708 may be formed from silicon, although other materials may be used here.

In FIG. 7, it can be seen that different path lengths exist between the input of the feed path 702 (located at the bottom of the feed path 702 in FIG. 7) and different unit cells 502. In this particular example, the shortest path length exists between the input of the feed path 702 and the bottom left unit cell 502, and the longest path length exists between the input of the feed path 702 and the top right unit cell 502. As with the supercells 624 themselves, without compensation, these different path lengths would cause different portions of an optical signal to reach the unit cells 502 at different times. In some cases, the phase shifts provided by the modulators 508 in the unit cells 502 can, among other things, be used to compensate for the different path lengths between the input of the feed path 702 and each unit cell 502. Also or alternatively, linear or other phase shifters may be used to compensate for the different path lengths between the input of the feed path 702 and each unit cell 502.

Note that if each supercell 624 includes a 32×32 arrangement of unit cells 502, each supercell 624 would include thirty-two rows of unit cells 502, where each row includes thirty-two unit cells 502. Thus, the portion 638 shown in FIG. 7 would be replicated sixteen times within each supercell 624. However, it is possible for the supercells 624 to each have a different number and arrangement of unit cells 502 as needed or desired.

In some embodiments, all of the components in the architecture 600 of FIG. 6 may be implemented in an integrated manner, such as when implemented using a single integrated electrical and photonic chip. As noted above, for example, different components of the architecture 600 may be fabricated using silicon and silicon nitride, which enables fabrication using standard silicon-based processes. When implemented in an integrated manner, the architecture 600 may be implemented using a single photonic integrated circuit chip, and there may be no need for components such as the fiber inputs/outputs 310, fiber mounts 404, and optical fibers 406. However, integration of the components in the architecture 600 is not necessarily required. Thus, for example, the source laser 602 may be implemented off-chip or replaced using standard erbium-doped fiber amplifier lasers or other external lasers. As another example, the receiver 606 may be implemented off-chip.

As can be seen in FIG. 6, photodetectors 640 may be used in the source laser 602. Samples of the optical signals produced by the semiconductor optical amplifiers 618 can be obtained via signal lines 642a and mixed (heterodyned) with samples of the lower-power input beam from the laser 608a obtained via a signal line 642b. The photodetectors 640 receive these heterodyned signals and generate measurements of the heterodyned signals. Outputs of the photodetectors 640 can be used to control components of the source laser 602 (such as one or more components in the arms) in order to phase-lock the individual paths or arms within the source laser 602. As a particular example, the electronic control board 408 may use the outputs of the photodetectors 640 to adjust the phase shifters 616 in order to phase-lock the individual arms within the source laser 602. Note that in this example, only the output of the laser 608a may be used for heterodyning. In some embodiments, the optical signals produced by the laser 608a are used when the entire photonic integrated circuit 402 (meaning all supercells 624) is being used to transmit common optical signals, such as to achieve the longest range or highest data rate. In other modes of use, different arms of the source laser 602 may be expected to have different phases.

As noted above, the photonic integrated circuit 402 can be driven so that different supercells 624 or different collections of supercells 624 are used to transmit or receive optical signals, such as in different directions. For example, different optical signals from different lasers 608a-608d can be provided to different arms of the source laser 602 and modified in different ways by the phase shifters 616 and semiconductor optical amplifiers 618. Those different optical signals can then be provided (via the optical matrix 622, waveguides 626a-626b, splitters 628a-628b and 630a-630b, and time delay paths 632a-632b) to different supercells 624 or different collections of supercells 624. Those different supercells 624 or different collections of supercells 624 may then transmit different optical signals in different directions. In FIG. 6, the different optical signals being transmitted in different directions include optical signals 644a-644c, which may be respectively associated with the lasers 608b-608d and indicate that the optical signals 644a-644c have different wavelengths for interference mitigation. However, this is not necessarily required, and different optical signals 644a-644c may be produced using optical signals from the same individual laser 608a-608d (such as via different phase shifts and modulations in different arms of the source laser 602). Again, the laser 608a may be used to drive the entire photonic integrated circuit 402 (meaning all supercells 624) or used to produce another optical signal (such as in addition to the optical signals 644a-644c). In the receive direction, different supercells 624 or different collections of supercells 624 may be used to provide different optical signals to different arms of the source laser 602, which can provide the optical signals (via the circulators 620) to the receiver 606 for processing.

The number of different directions in which optical signals can be transmitted or received by the photonic integrated circuit 402 can vary based on particular needs and may be reconfigurable. In some cases, the number of transmit/receive directions supported by the photonic integrated circuit 402 may equal the number of supercells 624. As a particular example, the photonic integrated circuit 402 may be capable of supporting up to 1,024 separate, full-rate optical links. By adding support for one or more multiplexing techniques, an even larger number of user connections may be supported, or wavelength offsets may be supported to mitigate interference effects for overlapping optical beams. Interference mitigation often involves the use of at least four distinct optical wavelengths, which is why the source laser 602 is shown here as including four lasers 608a-608d. However, if interference mitigation is not needed or desired, fewer than four lasers 608a-608d may be used in the source laser 602.

When optical communications over only a single optical link are needed or desired, the architecture 600 may be configured to use all supercells 624 in the OPA 604, which can help to achieve the longest range or highest data rate (although one or a subset of the supercells 624 may also be used here). When optical communications over multiple optical links are needed or desired, different individual supercells 624 or collections of supercells 624 can be selected for use with different optical links, and those individual supercells 624 or collections of supercells 624 can be driven differently to support suitable communications over the different optical links. The specific supercell 624 or collection of supercells 624 used for each optical link may be determined in any suitable manner, such as when the electronic control board 408 or other component identifies the supercell 624 or collection of supercells 624 having an optimal view of another optical node (such as based on an incoming beacon signal). While the two example collections of supercells 624 in FIG. 6 are shown as being rectangular, this is not necessarily required, as can be seen in FIG. 2A.

Moreover, depending on the use case, the different optical links being supported by the architecture 600 can have other characteristics that are different (in addition to direction). For example, different optical links may be used to transport different data streams, thereby providing "multi-stream" capabilities. The data streams being transported over the different optical links may have a common data rate or different data rates, and the different optical links may have a common range or different ranges. In addition, the optical beams in the different optical links may have a common spatial shape or different spatial shapes, and the optical beams in the different optical links may have a common spatial size or different spatial sizes. The number of optical links supported and the supercells 624 used for those optical links can be easily controlled, enabling rapid reconfiguration of the OPA 604. For instance, the OPA 604 can be easily reconfigured between (i) one operating mode supporting a single full-aperture data stream modality (meaning all supercells 624 can transmit or receive the same optical signals) and (ii) another operating mode supporting a multi-node, multi-stream modality for shorter-range highly-distributed data handling.

As mentioned above, one or more multiplexing techniques might also be supported in the architecture 600. For example, the architecture 600 may support spatial steering of optical communications, which means that each supercell 624 or collection of supercells 624 may be driven to change the direction in which that supercell 624 or collection of supercells 624 is communicating. This may occur, for instance, via appropriate control of the associated modulators 508, phase shifters 616, and amplifiers 618 (or a subset thereof) and can be referred to as spatial division multiplexing. This provides the architecture 600 with the ability to redirect each optical link to support communications with multiple external devices. Similarly, time division multiplexing may be supported by the architecture 600, where different external devices may communicate over the same optical link at different times. Further, it is possible for the architecture 600 to switch which frequencies are being used by the different optical links by switching which lasers 608a-608d are used to drive different supercells 624 or collections of supercells 624, which can be referred to as wavelength division multiplexing. In addition, the architecture 600 may support any combination of different forms of multiplexing, such as two or more of spatial division multiplexing, time division multiplexing, and wavelength division multiplexing. This provides the architecture 600 with even greater flexibility in terms of the number of optical links supported.

Although FIGS. 6 and 7 illustrate one example of an architecture 600 of a photonic integrated circuit 402 supporting multi-node, multi-stream free-space optical communication, various changes may be made to FIGS. 6 and 7. For example, this particular embodiment logically splits the photonic integrated circuit 402 in half by using two sets of waveguides 626a-626b, two sets of splitters 628a-628b, 630a-630b, and two sets of time delay paths 632a-632b. However, the photonic integrated circuit 402 may be logically split into other numbers of portions or not logically split. Also, various components in FIGS. 6 and 7 may be combined, further subdivided, replicated, omitted, or rearranged and additional components may be added according to particular needs.

As described above, various modulators (such as the modulators 508 and modulators implementing the phase shifters 616) may be implemented in various ways. In some embodiments, optical phase shifts may be provided using a modulator by (i) changing the index of refraction of a waveguide carrying an optical signal or (ii) changing the charge carrier density of a waveguide carrying an optical signal. The first approach may be achieved using thermal resonators, and the second approach may be achieved using PN junction micro-ring modulators. One possible advantage of PN junction micro-ring modulators over thermal resonators is power consumption, since PN junction micro-ring modulators may consume very small amounts of power (such as less than 10 µW each).

Figure 8:
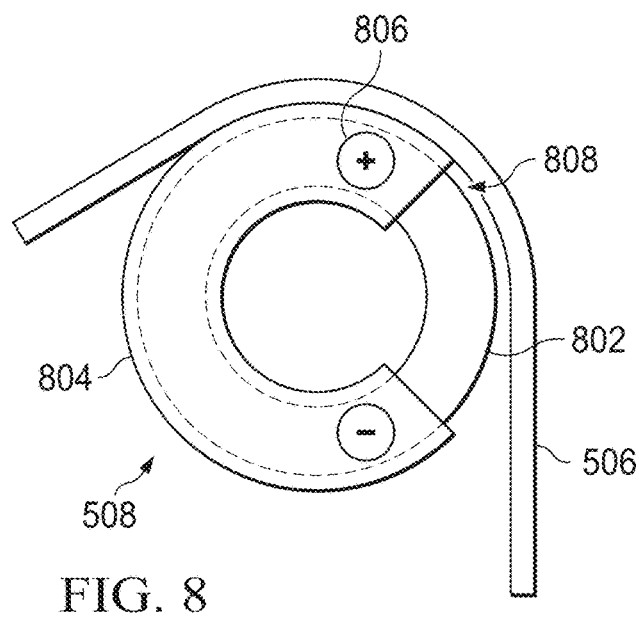
FIGS. 8 and 9 illustrate example modulators in a photonic integrated circuit according to this disclosure.
Figure 9:
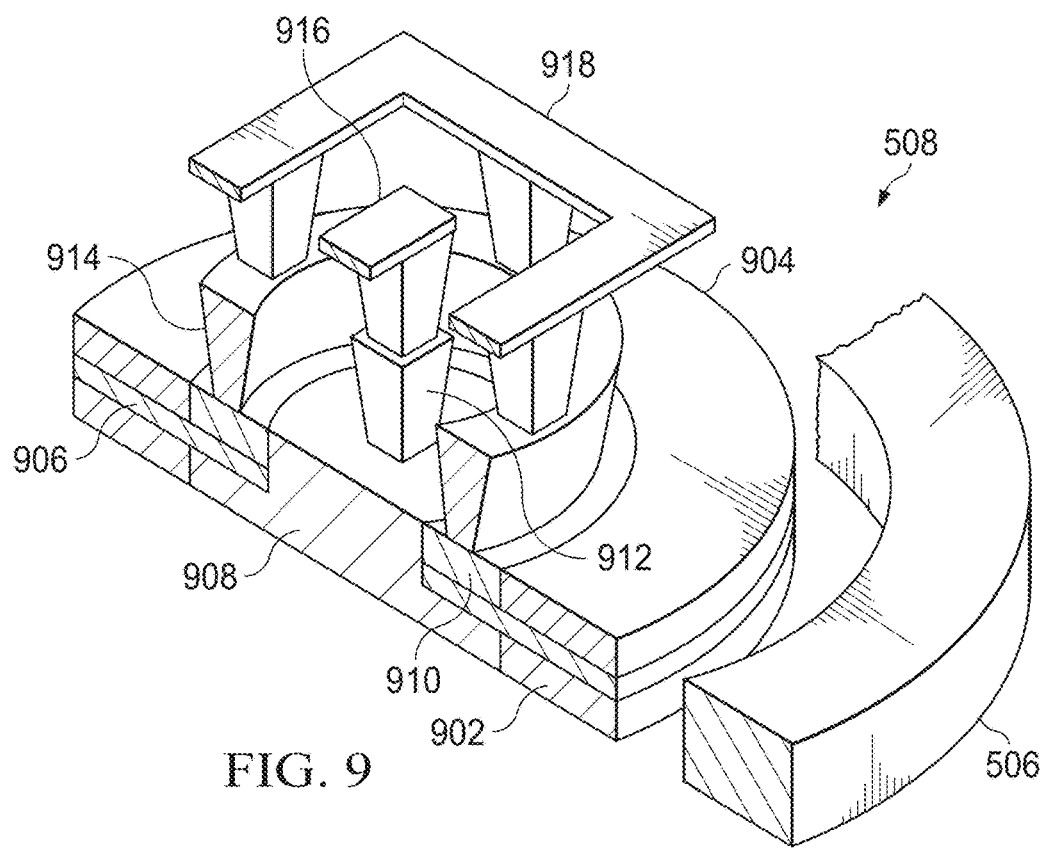

FIGS. 8 and 9 illustrate example modulators 508 in a photonic integrated circuit 402 according to this disclosure. The same or similar types of structures may be used in the phase shifters 616. As shown in FIG. 8, the modulator 508 here represents a thermal resonator that is implemented using a micro-ring resonator 802 and a heater 804 positioned above or otherwise near the micro-ring resonator 802. The micro-ring resonator 802 resonates based on an optical signal flowing through an associated signal pathway 506. Varying the temperature of the micro-ring resonator 802 alters the resonance wavelength of the micro-ring resonator 802, thereby changing the phase of the optical signal flowing through the signal pathway 506. Voltages can be applied to two electrical contacts 806 of the heater 804 in order to create the desired temperature change and therefore implement the desired phase shift of the optical signal flowing through the signal pathway 506. The voltages applied to the electrical contacts 806 of the heater 804 can represent the output voltages from the amplifiers 516 and 518. When the modulator 508 is used in a unit cell 502, different voltages applied to the beater 804 by the corresponding DRIIC cell 512 can cause different phase shifts to occur in the modulator 508.

The micro-ring resonator 802 may be formed from any suitable material(s), such as silicon, and in any suitable manner. The heater 804 may be formed from any suitable material(s), such as one or more metals, and in any suitable manner. The micro-ring resonator 802 may be separated from the heater 804 by any suitable material(s), such as silicon dioxide. The micro-ring resonator 802 and heater 804 may each have any suitable size, shape, and dimensions. In some embodiments, the micro-ring resonator 802 is annular and has a diameter of about 5.5 µm, and the heater 804 is crescent-shaped and has a diameter of about 5.5 µm. However, other shapes and sizes may be used here. The electrical contacts 806 of the heater 804 here can be coupled to the outputs of the corresponding DRIIC cell 512 or another component in any suitable manner, such as via flip-chip bonding. A gap 808 between the micro-ring resonator 802 and the signal pathway 506 may have any suitable value, such as about 150 nm to about 210 nm (±10 nm). In some cases, design parameters like the thickness of the micro-ring resonator 802 or the size of the gap 808 can be altered in order to provide desired functionality for the phase modulator 508.

As shown in FIG. 9, the modulator 508 here represents a PN junction micro-ring modulator that is implemented using various regions of semiconductor material, such as doped and undoped silicon. In this example, the modulator 508 is shown in cross-section for explanation. Here, the modulator 508 includes a first annular semiconductor region 902 separated from a second annular semiconductor region 904. The annular semiconductor regions 902 and 904 can represent different types of semiconductor material, such as when the annular semiconductor region 902 represents an N-type semiconductor material and the annular semiconductor region 904 represents a P-type semiconductor material. A semiconductor region 906 (such as undoped silicon) can separate the regions 902-904. A doped semiconductor region 908 is positioned within the annular regions 902-904, and a doped semiconductor region 910 is positioned around an upper portion of the doped semiconductor region 908. The doped semiconductor regions 908 and 910 can represent different regions of semiconductor material with different dopants, such as when the doped semiconductor region 908 is doped with an N+ dopant and the doped semiconductor region 910 is doped with a P+ dopant. An electrical contact 912 can be used to form an electrical connection with the doped semiconductor region 908, and an electrical contact 914 can be used to form an electrical connection with the doped semiconductor region 910. An electrical connection 916 can be used to provide a voltage to the electrical contact 912, and an electrical connection 918 can be used to provide a voltage to the electrical contact 914.

Here, the various semiconductor regions 902-910 form a PN junction micro-ring modulator, and the electrical contacts 912, 914 and electrical connections 916, 918 allow voltages to be applied that alter the charge carrier density of the PN junction micro-ring modulator. This alters the phase of an optical signal flowing through the associated signal pathway 506. When the modulator 508 is used in a unit cell 502, the electrical connections 916, 918 here can be coupled to the outputs of the corresponding DRIIC cell 512 in any suitable manner, such as via flip-chip bonding. Voltages applied to the electrical connections 916, 918 can provide the desired voltage difference and therefore implement the desired phase shift of the optical signal flowing through the signal pathway 506. The voltages applied to the electrical connections 916, 918 can represent the output voltages from the amplifiers 516 and 518. As noted above, different voltages applied to the electrical connections 916, 918 by the corresponding DRIIC cell 512 or another component can cause different phase shifts to occur in the modulator 508.

Although FIGS. 8 and 9 illustrate examples of modulators 508 in a photonic integrated circuit 402, various changes may be made to FIGS. 8 and 9. For example, the actual structure of a thermal resonator or PN junction micro-ring modulator can vary as needed or desired. Also, any other suitable structure may be used to modulate an optical signal in the photonic integrated circuit 402.

The following describes example embodiments of this disclosure that implement or relate to multi-node, multi-stream PIC-based free-space optical communications. However, other embodiments may be used in accordance with the teachings of this disclosure.

In a first embodiment, an apparatus includes a photonic integrated circuit having an optical phased array. The optical phased array includes multiple unit cells, where each unit cell includes an antenna element configured to transmit or receive optical signals. The unit cells are grouped into multiple supercells, and each supercell includes multiple unit cells. The apparatus also includes multiple arms configured to modify the optical signals transmitted or received by the optical phased array. Different ones of the arms are controllable to support transmission or reception of different optical signals in different directions.

In a second embodiment, a method includes transmitting or receiving optical signals using a photonic integrated circuit having an optical phased array. The optical phased array includes multiple unit cells, where each unit cell includes an antenna element that transmits or receives the optical signals. The unit cells are grouped into multiple supercells, and each supercell includes multiple unit cells. The method also includes controlling multiple arms to modify the optical signals transmitted or received by the optical phased array. Different ones of the arms are controllable to support transmission or reception of different optical signals in different directions.

In a third embodiment, an optical node includes multiple optical transmitters, optical receivers, or optical transceivers. Each optical transmitter, optical receiver, or optical transceiver includes a photonic integrated circuit having an optical phased array. The optical phased array includes multiple unit cells, where each unit cell includes an antenna element configured to transmit or receive optical signals. The unit cells are grouped into multiple supercells, and each supercell includes multiple unit cells. Each optical transmitter, optical receiver, or optical transceiver also includes multiple arms configured to modify the optical signals transmitted or received by the optical phased array. Different ones of the arms are controllable to support transmission or reception of different optical signals in different directions.

Any single one or any suitable combination of the following features may be used with the first, second, or third embodiment. The multiple arms may include electro-optic modulators configured to modulate the optical signals transmitted or received by the optical phased array, phase shifters configured to shift phases of the optical signals transmitted or received by the optical phased array, and semiconductor optical amplifiers configured to amplify the optical signals transmitted or received by the optical phased array. The phase shifters, the semiconductor optical amplifiers, or a combination thereof may be controllable to support the transmission or reception of the different optical signals in the different directions. Multiple lasers may be configured to generate multiple input beams having different wavelengths. Multiple switches may be configured to selectively control which of the input beams is provided to the multiple arms. The multiple lasers may include at least four lasers configured to generate at least four input beams having at least four different wavelengths. The switches may be configurable in a first operational mode to allow the input beam from one of the lasers to be used to drive all of the supercells in the photonic integrated circuit. The switches may be configurable in a second operational mode to allow different ones of the input beams from different ones of the lasers to be used to drive different supercells or different collections of supercells in the photonic integrated circuit. Each unit cell may further include a phase modulator configured to modify a phase of the optical signals being transported through a signal pathway of the unit cell. The different optical signals may be associated with different streams of data. At least one of spatial division multiplexing, time division multiplexing, and wavelength division multiplexing may be supported for optical communications involving the different optical signals. Reconfiguration may be allowed to support optical communications over a varying number of optical links.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive (HDD), a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
a photonic integrated circuit comprising an optical phased array, the optical phased array comprising multiple unit cells, each unit cell comprising an antenna element configured to transmit or receive optical signals, wherein the unit cells are grouped into multiple supercells and each supercell includes multiple unit cells;
multiple optical pathways configured to modify the optical signals transmitted or received by the optical phased array, wherein different ones of the optical pathways are controllable to support transmission or reception of different optical signals in different directions; and
multiple switches configured to receive multiple input beams having different wavelengths and selectively control which of the input beams is provided to the multiple optical pathways;
wherein the switches are configurable in a first operational mode to allow one of the input beams to be used to drive all of the supercells in the photonic integrated circuit; and
wherein the switches are configurable in a second operational mode to allow different ones of the input beams to be used to drive different supercells or different collections of supercells in the photonic integrated circuit.

2. The apparatus of claim 1, wherein the multiple optical pathways comprise:
electro-optic modulators configured to modulate the optical signals transmitted or received by the optical phased array;
phase shifters configured to shift phases of the optical signals transmitted or received by the optical phased array; and
semiconductor optical amplifiers configured to amplify the optical signals transmitted or received by the optical phased array.

3. The apparatus of claim 2, wherein the phase shifters, the semiconductor optical amplifiers, or a combination thereof are controllable to support the transmission or reception of the different optical signals in the different directions.

4. The apparatus of claim 1, further comprising:
multiple lasers configured to generate the multiple input beams having the different wavelengths.

5. The apparatus of claim 4, wherein the multiple lasers comprise at least four lasers configured to generate at least four input beams having at least four different wavelengths.

6. The apparatus of claim 1, wherein each unit cell further comprises a phase modulator configured to modify a phase of the optical signals being transported through a signal pathway of the unit cell.

7. The apparatus of claim 1, wherein the different optical signals are associated with different streams of data.

8. The apparatus of claim 1, wherein the apparatus is configured to support at least one of: spatial division multiplexing, time division multiplexing, and wavelength division multiplexing for optical communications involving the different optical signals.

9. The apparatus of claim 1, wherein the apparatus is reconfigurable to support optical communications over a varying number of optical links.

10. A method comprising:
transmitting or receiving optical signals using a photonic integrated circuit comprising an optical phased array, the optical phased array comprising multiple unit cells, each unit cell comprising an antenna element that transmits or receives the optical signals, wherein the unit cells are grouped into multiple supercells and each supercell includes multiple unit cells;
controlling multiple optical pathways to modify the optical signals transmitted or received by the optical phased array, wherein different ones of the optical pathways are controllable to support transmission or reception of different optical signals in different directions; and
selectively controlling which of multiple input beams having different wavelengths is provided to the multiple optical pathways using multiple switches;
wherein, in a first operational mode, the switches allow one of the input beams to be used to drive all of the supercells in the photonic integrated circuit; and
wherein, in a second operational mode, the switches allow different ones of the input beams to be used to drive different supercells or different collections of supercells in the photonic integrated circuit.

11. The method of claim 10, wherein the multiple optical pathways comprise:
electro-optic modulators that modulate the optical signals transmitted or received by the optical phased array;
phase shifters that shift phases of the optical signals transmitted or received by the optical phased array; and
semiconductor optical amplifiers that amplify the optical signals transmitted or received by the optical phased array.

12. The method of claim 11, wherein the phase shifters, the semiconductor optical amplifiers, or a combination thereof are controllable to support the transmission or reception of the different optical signals in the different directions.

13. The method of claim 10, further comprising:
generating the multiple input beams having the different wavelengths using multiple lasers.

14. The method of claim 13, wherein the multiple lasers comprise at least four lasers that generate at least four input beams having at least four different wavelengths.

15. The method of claim 10, wherein each unit cell further comprises a phase modulator that modifies a phase of the optical signals being transported through a signal pathway of the unit cell.

16. The method of claim 10, wherein the different optical signals are associated with different streams of data.

17. The method of claim 10, further comprising:
providing at least one of: spatial division multiplexing, time division multiplexing, and wavelength division multiplexing for optical communications involving the different optical signals.

18. An optical node comprising:
multiple optical transmitters, optical receivers, or optical transceivers;
wherein each optical transmitter, optical receiver, or optical transceiver comprises:
a photonic integrated circuit comprising an optical phased array, the optical phased array comprising multiple unit cells, each unit cell comprising an antenna element configured to transmit or receive optical signals, wherein the unit cells are grouped into multiple supercells and each supercell includes multiple unit cells;

multiple optical pathways configured to modify the optical signals transmitted or received by the optical phased array, wherein different ones of the optical pathways are controllable to support transmission or reception of different optical signals in different directions; and multiple switches configured to receive multiple input beams having different wavelengths and selectively control which of the input beams is provided to the multiple optical pathways;

wherein the switches are configurable in a first operational mode to allow one of the input beams to be used to drive all of the supercells in the photonic integrated circuit; and wherein the switches are configurable in a second operational mode to allow different ones of the input beams to be used to drive different supercells or different collections of supercells in the photonic integrated circuit.

19. The optical node of claim 18, wherein, in each optical transmitter, optical receiver, or optical transceiver, the multiple optical pathways comprise:

electro-optic modulators configured to modulate the optical signals transmitted or received by the optical phased array;

phase shifters configured to shift phases of the optical signals transmitted or received by the optical phased array; and semiconductor optical amplifiers configured to amplify the optical signals transmitted or received by the optical phased array.

20. The optical node of claim 19, wherein, in each optical transmitter, optical receiver, or optical transceiver, the phase shifters, the semiconductor optical amplifiers, or a combination thereof are controllable to support the transmission or reception of the different optical signals in the different directions.

* * * * *